US008958109B2

(12) United States Patent
Natarajan

(10) Patent No.: US 8,958,109 B2
(45) Date of Patent: *Feb. 17, 2015

(54) CLOUD AND HTML BASED DOCUMENT MANAGEMENT AND CREATION SYSTEM

(71) Applicant: Sundaram Natarajan, Fremont, CA (US)

(72) Inventor: Sundaram Natarajan, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/251,624

(22) Filed: Apr. 13, 2014

(65) Prior Publication Data

US 2014/0229318 A1 Aug. 14, 2014

Related U.S. Application Data

(63) Continuation-in-part of application No. 13/441,781, filed on Apr. 6, 2012, now Pat. No. 8,699,073, and a continuation-in-part of application No. 14/231,025, filed on Mar. 31, 2014.

(60) Provisional application No. 61/473,680, filed on Apr. 8, 2011, provisional application No. 61/807,214, filed on Apr. 1, 2013.

(51) Int. Cl.
*G06F 3/12* (2006.01)
*G06F 17/24* (2006.01)
*G06F 17/22* (2006.01)
*G06Q 30/06* (2012.01)
*G06F 17/30* (2006.01)
*G06K 15/00* (2006.01)

(52) U.S. Cl.
CPC .......... *G06F 17/241* (2013.01); *G06F 17/2247* (2013.01); *G06Q 30/0621* (2013.01); *G06F 17/30011* (2013.01)
USPC ........................................ 358/1.15; 358/1.18

(58) Field of Classification Search
CPC ..................... G06K 9/00672; G06F 17/30896; G06F 17/309; G06F 17/30905; G06F 21/128; G06F 3/1246; G06F 3/1248; H04N 112/5835; H04N 21/2355; H04N 21/4355
USPC ............... 358/1.1, 1.9, 1.13, 1.14, 1.15, 1.18; 707/E17.121, E17.118; 715/230, 232, 715/233, 234, 239
See application file for complete search history.

(56) References Cited

U.S. PATENT DOCUMENTS 6,613,098 B1 * 9/2003 Sorge et al. ................... 715/234
2004/0163042 A1 * 8/2004 Altman ......................... 715/512

(Continued)

*Primary Examiner* — Gabriel Garcia
(74) *Attorney, Agent, or Firm* — Stephen E. Zweig

(57) ABSTRACT

A web-browser/web server method of creating new documents and signing existing documents, in particular faxes and email attachments, useful for ecommerce and other applications. Documents or document components are sent to the web server. At the web server, the images of the documents are converted to an image layer, and are manipulated by combining the image layer with annotation layers constructed from instructions and data that are uploaded by the user from a web browser or app running on a remote computerized device. The system and method manipulates the documents using HTML5 based image manipulation features such as the <canvas> element. Using this method, users may view and otherwise manipulate documents from their web browsers as if the documents were residing on their local machine. Users may then instruct the remote server to transmit to the intended destination by analog or electronic fax, email attachment, download, or other means.

19 Claims, 23 Drawing Sheets

(56) References Cited

U.S. PATENT DOCUMENTS

| | | | |
|---|---|---|---|
| 2005/0198202 A1* | 9/2005 | Yamamoto | 709/218 |
| 2009/0148043 A1* | 6/2009 | Ophir et al. | 382/176 |
| 2010/0114995 A1* | 5/2010 | Kopp et al. | 707/811 |
| 2010/0251144 A1* | 9/2010 | Shaty | 715/760 |
| 2010/0281351 A1* | 11/2010 | Mohammed | 715/205 |
| 2011/0167331 A1* | 7/2011 | Altman | 715/233 |
| 2011/0314371 A1* | 12/2011 | Peterson et al. | 715/234 |

* cited by examiner

Fax Inbox

Messages

Inbox (3480)

Page 1 of 779 authorizations(0) [edit] [delete]
BIOPSIES(0) [edit] [delete]
DME(0) [edit] [delete]
HUNTER(0) [edit] [delete]
LabReports(0) [edit] [delete]
MISCLABS(0) [edit] [delete]
NORCAL(0) [edit] [delete]
QUEST(0) [edit] [delete]
RxRefills(1168) [edit] [delete]
STROSE(163) [edit] [delete]
SVMI(0) [edit] [delete]
WHHS(82) [edit] [delete]

Add New Folder

1702

| | | |
|---|---|---|
| ☐ | Fax - #17558 - 10/13/1969, Biopsy Report | 04/04/2012 - 12:01:20 |
| ☐ | A New Fax from 510 429-9090 | 04/04/2012 - 12:01:19 |
| ☐ | A New Fax from 510 293-9031 | 04/04/2012 - 12:01:08 |
| ☐ | A New Fax from 614 339-4846, Omnicare of Lodi | 04/04/2012 - 12:01:07 |
| ☐ | A New Fax from 254 299-5293 | 04/04/2012 - 12:01:07 |
| ☐ | A New Fax from 847 813-4621 | 04/04/2012 - 11:51:02 |
| ☐ | A New Fax from 480 391-4600 | 04/04/2012 - 11:51:01 |
| ☐ | A New Fax from 510 538-0856 | 04/04/2012 - 11:51:00 |
| ☐ | A New Fax from 510 538-4577 | 04/04/2012 - 11:50:59 |
| ☐ | A New Fax from 510 782-3807 | 04/04/2012 - 11:35:54 |
| ☐ | A New Fax from 510 657-1625, Safeway Pharmacy | 04/04/2012 - 11:35:52 |
| ☐ | Fax - #24545 - 09/27/1949, | 04/04/2012 - 11:35:52 |
| ☐ | A New Fax from 732 389-4930 | 04/04/2012 - 11:35:51 |
| ☐ | A New Fax from 510 797-2074 | 04/04/2012 - 11:35:51 |
| ☐ | A New Fax from 510 781-9900 | 04/04/2012 - 11:35:48 |
| ☐ | A New Fax from 732 389-4930 | 04/04/2012 - 11:35:47 |

1700

Ecommerce customer (buyer) designing custom gift card using their web browser or mobile app

CLOUD AND HTML BASED DOCUMENT MANAGEMENT AND CREATION SYSTEM

This application is a continuation in part of U.S. application Ser. No. 13/441,781, "CLOUD AND HTML BASED FAX AND DOCUMENT MANAGEMENT SYSTEM", inventor Sundaram Natarajan, filed Apr. 6, 2012; application Ser. No. 13/441,781 in turn claimed the priority benefit of U.S. provisional application 61/473,680, "CLOUD AND HTML BASED FAX AND DOCUMENT MANAGEMENT SYSTEM", inventor Sundaram Natarajan, filed Apr. 8, 2011; this application is also a continuation in part of U.S. application Ser. No. 14/231,025 "METHOD FOR RAPID DEVELOPMENT OF SCHEDULE CONTROLED NETWORKABLE MERCHANT ECOMMERCE SITES", inventor Sundaram Natarajan, filed Mar. 31, 2014; application Ser. No. 14/231,025 in turn claimed the priority benefit of U.S. provisional application 61/807,214 "METHOD FOR RAPID DEVELOPMENT OF SCHEDULE CONTROLLED NETWORKABLE MERCHANT ECOMMERCE SITES", inventor Sundaram Natarajan, filed Apr. 2, 2013; the contents of all of these applications are incorporated herein by reference.

BACKGROUND OF THE INVENTION

1. Field of the Invention

This invention is in the field of faxing and electronic document management technology, and also in the field of document creation technology.

2. Description of the Related Art

Many business functions in modern life are based upon transactions in which an individual receives paper forms, often by fax or by downloading from the Internet, prints out the forms, fills in a few items, signs the form, and then either faxes the form somewhere else, or else scans the form and emails the form somewhere else.

For example, Doctor's offices are constantly inundated with insurance forms, patient forms, and prescription refill request forms. These forms are often handled by fax over telephone lines, and thus the physician's staff often spends a considerable amount of time shuffling paper from fax machines, to the doctor, and back to other fax machines as a result. In addition to expense and inefficiency, this paper shuffling can also lead to errors as individual papers can often become lost, mishandled, and/or faxed to the wrong destination.

In the same way, contracts and government forms, for example tax forms, are also constantly being received, first in electronic form as email attachments, scans, faxes, downloads and the like. They are then briefly converted to paper for the purposes of the signature, and then converted back to electronic form for subsequent emailing as attachments, faxes, uploads, and the like. The resulting process is again quite time consuming and inefficient.

Various types of prior art document management systems have been proposed, exemplified by U.S. Pat. Nos. 6,411,685; 6,859,909; 7,164,488; 7,317,697; 7,339,707, and U.S. application Ser. Nos. 09/922,745; 09/939,440; and 10/476,833; they have suffered from various drawbacks. In addition to being either cumbersome to use, tied to proprietary technology, or simply not appropriately designed to adequately streamline the electronic to paper to electronic signature process, none have adequately met user needs.

Although the Adobe Acrobat family of products, produced by Adobe Systems, Inc., San Jose Calif. have had some success with various proprietary solutions to manage PDF documents, these proprietary solutions tend to consume much computer system resources, and also tend to lack flexibility and are restricted to fillable or structured PDF documents Thus the present unsatisfactory state of affairs of electronic to paper back to electronic conversions continues to be the standard method of conducting business. Further improvements in this area are thus desirable.

An additional problem exists in the field of remote document creation technology. In some applications, such as electronic commerce, an online purchaser of a product, such as a gift product may wish to create a customized gift card or other set of documents to send with the product. Although methods to allow partial customization, for example by allowing an online user to enter in text that can later be made part of a document exist, the ability to easily customize such documents using standard online tools remains suboptimal.

BRIEF SUMMARY OF THE INVENTION

Ideally what is needed is a simple, lightweight (e.g. minimal burden to the user or the user's equipment), and very low cost method to allow users to streamline the present cumbersome system of "electronic to paper to electronic" document signing and annotation, as well as for other types of document creation.

The present invention is for a web (cloud) based document management and document creation system that allows users, equipped with standard computerized devices and web browsers (or apps), to create virtual paper copies of relevant faxes and other documents on remote servers, sign or otherwise annotate these virtual copies, and then transmit the final signed or annotated results to the user's designated recipient, all without ever having to handle paper or sign paper copies of documents. In other embodiments, the present invention can also be used by ecommerce customers purchasing gifts and other products to create documents, such as gift cards, intended to be delivered to the recipient along with the purchased gifts or other products.

The system takes advantage of recent advances in HTML functionality, such as the <canvas> element recently introduced in HTML5 and/or (other alternative HTML image manipulation element(s)) to manipulate high quality images of faxes and documents on remote web servers, while also showing high quality images of the resulting annotated documents on the user's local web browser. This allows the user to conveniently manipulate a virtual electronic copy of the document with the same ease and speed as a paper copy of the document, but without the hassles of having to print to paper, handle paper, and scan paper.

In one embodiment, the invention may be a web-browser/web server based method of signing documents, in particular faxes and email attachments. Documents are uploaded to the invention's web server (alternatively called a signature web server); often by analog or electronic fax reception, email attachment, or upload. At the signature web server, the documents are converted to an image layer, and are signed, manipulated, and otherwise altered by combining the resulting document image layer with various annotation layers. These annotation layers are created by the user (signer) and reside on the annotation server, but are created from commands coming from the user's web browser or app (e.g. a smartphone or tablet app).

In a preferred embodiment, the system and method manipulates the documents using HTML5 based image manipulation features such as the <canvas> element, or equivalent HTML based image elements. Using this method, users may view, sign, annotate, and otherwise manipulate documents from their web browsers as if the documents were residing on their local machine. Users may create signed and otherwise annotated documents, and then instruct the remote web server to transmit the annotated or signed document to the user's desired destination by essentially any and all transmission methods. Thus the final annotated document can be transmitted by analog or electronic fax methods, email attachment, direct web service connection, download, or even transmitted by a physically mailed hard copy if desired.

BRIEF DESCRIPTION OF THE DRAWINGS

FIG. 10 shows the user in the process of moving a previously uploaded signature image into the correct portion of the previously uploaded IRS tax form.

FIG. 17 shows how the system may use incoming fax telephone numbers or incoming Called Subscriber Identification (CSID) text string data to automatically identify the source of a fax and to store faxes from that source in the appropriate folder or database.

DETAILED DESCRIPTION OF THE INVENTION

Nomenclature: Here documents that exist in an electronic form for at least part of their life cycle are often referred to in the alternative in this document as "faxes" even though the document may not have actually been transmitted by an old style type analog fax transmission. Thus, for example, a document in PDF form that may be transmitted by an email attachment will often be referred to in the alternative as a "fax".

As previously discussed, the prior art method of handling and signing documents, such as faxes, was unsatisfactory due to the need to create what were often only temporary paper copies of the documents, simply for purposes of capturing a signature or other type of annotation.

Figure 1:
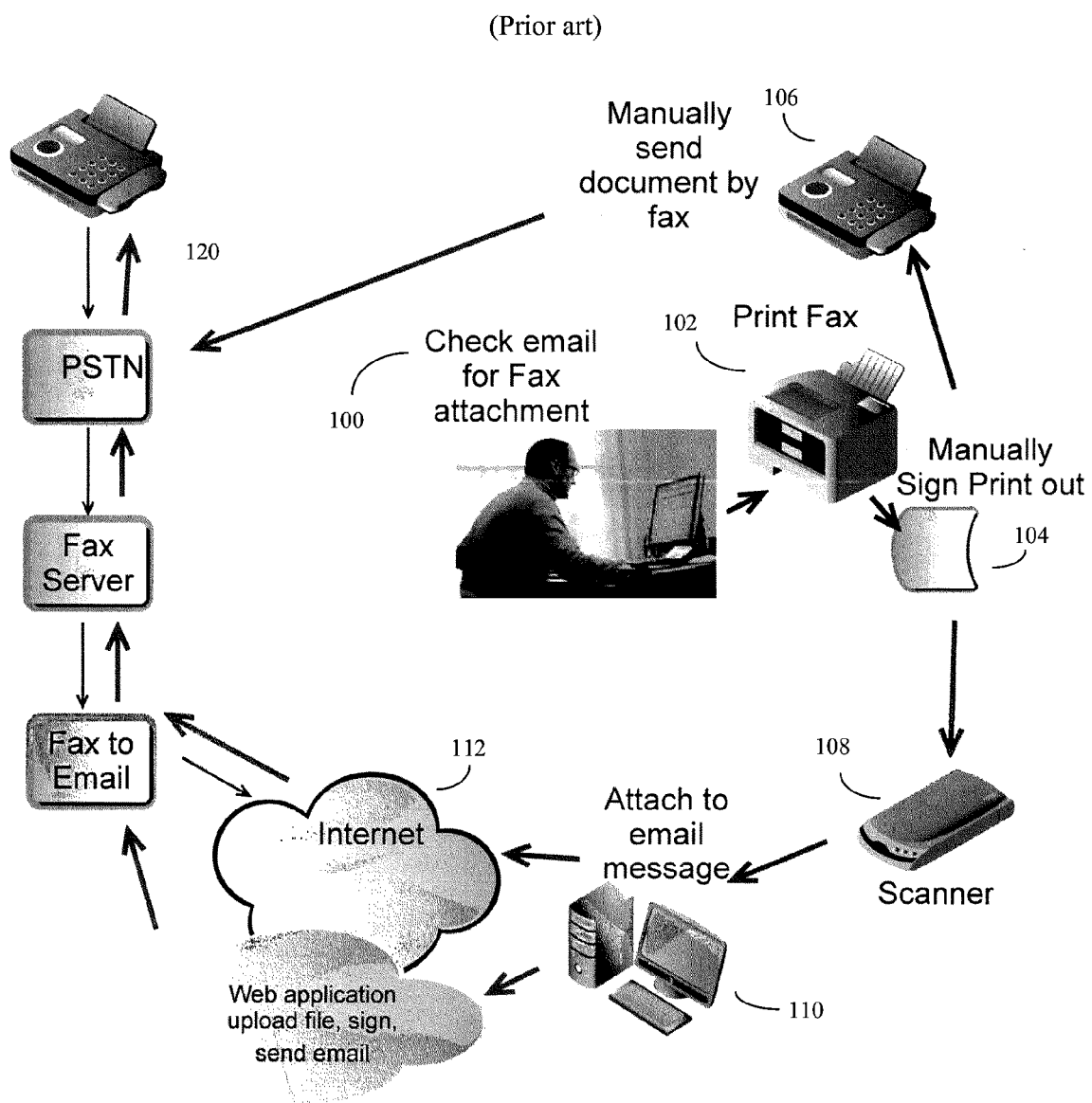
FIG. 1 shows an overview of prior art methods of signing faxes and documents. The documents needed to be printed out, signed, and then scanned or faxed to their recipients.

FIG. 1 shows an example of this type of prior art method. This prior art system grew out of a not completely satisfactory merging of earlier analog transmission fax methods, which sent copies of documents by analog signals over telephone lines and the like, with Internet email technology. As the use of email and email attachments expanded in popularity, often documents, such as contracts, agreements, or order forms, are first received by the user in the form of email attachments (100). The user would then print these out, creating a paper copy (102). The user would then manually sign the paper copy (104), and then either use an analog fax (106) to send the signed paper copy to the destination (120), or else scan the paper copy (108), producing an electronic file such as a PDF copy of the paper document. The user would then attach this PDF file to an email message (110), and transmit a PDF copy of the signed document over the internet (112) to various fax-to-email, fax servers, and other intermediaries, to the user's desired recipient or destination.

By contrast, the invention streamlines this inefficient process. In particular, the invention eliminates the necessity of having to produce an intermediate paper copy of the document for signing and annotation purposes.

Figure 2:
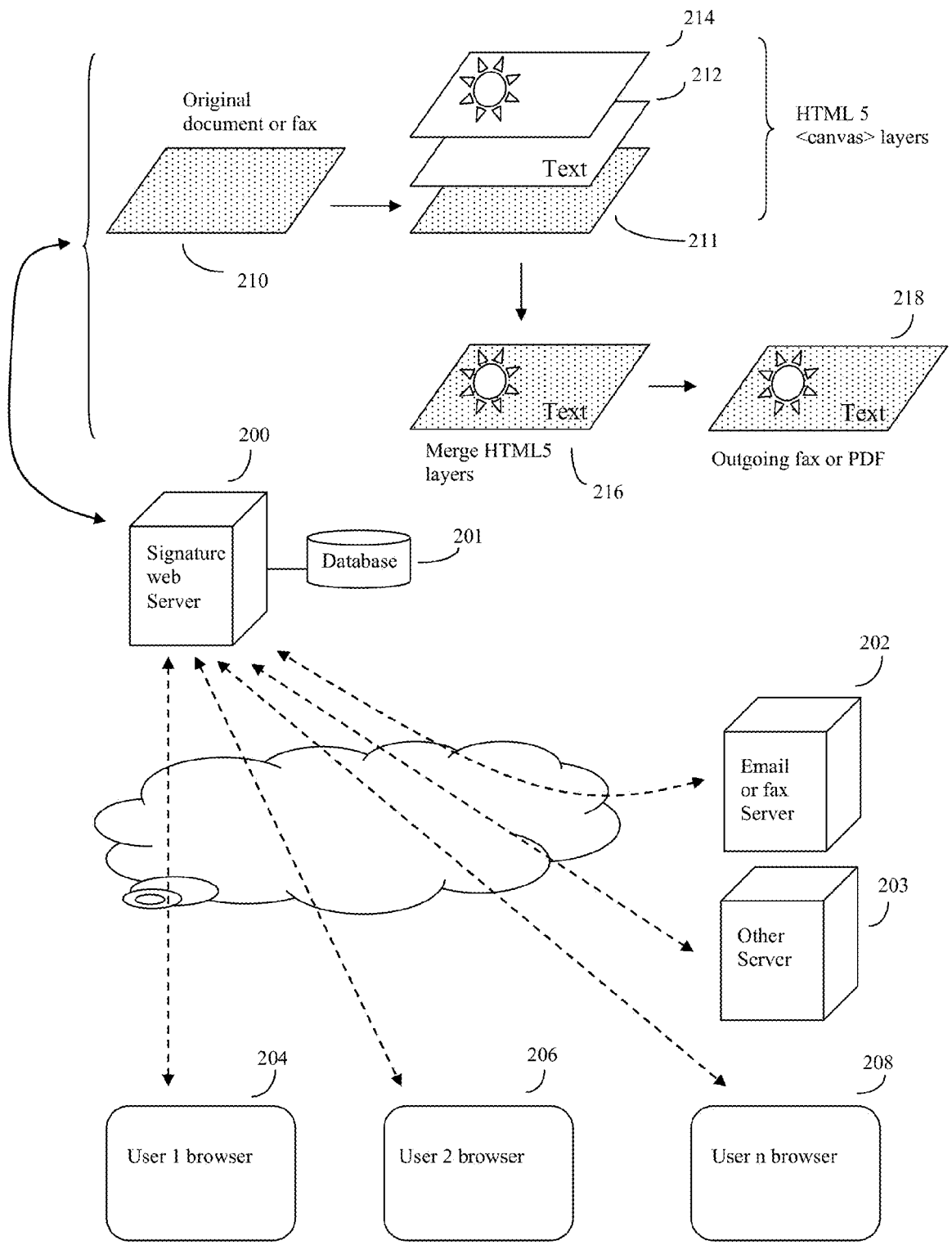
FIG. 2 shows an overview of the invention's Internet server (cloud) and HTML (HTML-5) based fax and document signing, creation, and management system, here shown interacting with various users running browser equipped computerized devices over the Internet.

FIG. 2 shows a drawing illustrating some embodiments of the inventions methods.

In one embodiment, the invention may be a method of annotating a web server stored document images using a web browser or other app. Because often these annotations will be user signatures, this web server will occasionally be referred to in this specification as a "signature web server" (200) to help designate this commonly used function, and to distinguish the invention's web server from other web servers. It should be understood, of course, that in fact the invention's signature web server will in fact generally be capable of many other functions as well. These other functions can include various ecommerce functions, which will be discussed shortly.

This method may, for example, work by first loading the document images onto the signature web server. These document images may come from many different sources. In some embodiments, the signature web server (200) can be either equipped with the analog circuitry necessary to receive and transmit standard analog fax transmissions, or else be in communication with other servers, devices, or services (e.g. eFax) equipped to receive standard analog fax transmissions. In other embodiments the signature web server may receive emails that contain attached documents, such as PDF attachments, by either standard email methods (e.g. POP or IMAP connections to email servers) (202) or by use of various email service (e.g. Gmail) Application Programming Interface (API) methods or by accessing documents through web services from other web servers. In other cases the document images may be directly uploaded to the signature web server (200) directly from the web browsers of various users running various computerized devices such as desktop computers, laptop computers, tablets, and smartphones (204), (206), (208). Some documents may also be stored on the signature web server's database (201). Other documents may be uploaded from third party web servers (203). Some documents may be located by various ecommerce merchants using various administrator control panels, such as administrator web pages, apps, and the like.

The signature web server (web server) may convert the documents to various electronic image formats as appropriate, and generally will operate on the document images using a virtual software image layer based strategy. In order to facilitate communication and synchronization with the various users running web browsers on various computerized devices (204), (206), (208), often it will be convenient to manipulate the document images on the signature web server using various HTML image functions. In a preferred embodiment, the invention may utilize the HTML5 <canvas> element, or other HTML based image manipulating elements.

Here for example, at the signature web server (200), the original document may be converted to a first document image layer (210). Thus, for example, the signature web server (200) may send an HTML version of the first document image layer (210) to user 1 (204), who may thus view this original document in his or her local web browser. (Alternatively this first HTML version may be produced by combining the first document image layer with empty or blank annotation layers). The signature web server will also send various web browser based image manipulation tools to user 1 (204) as well. User 1 can then use these web browser based image manipulation tools to annotate his or her image of the document (210) on his or her web browser (204). The web browser (204) will send the various user manipulations back to the signature web server (200). Here, for example, user text based manipulations (e.g. filling out an image of a form by apparently typing on the form in his or her web browser (204)) will be converted at the signature web server (200) into a text based image layer (212).

User manipulations of the document image (e.g. drawing on the image of the document in his or her web browser) will be transmitted over the internet from the user's web browser to the signature web server, and this data may be converted at the signature web server (200) into an image based annotation layer (214). In addition to applying new or previously uploaded signature images (or signature motions—i.e. drawing vector commands producing a signature), other user image manipulations may include standard electronic drawing commands including lines, rectangles, circles, ovals, arcs, curves, points, and brushstrokes of various widths, colors, and textures. Various stamps and other image templates may also be applied in this manner.

Some of these image based manipulations may be used to highlight or redact content from the original image (210). For example, a transparent yellow box could be imposed to emphasize some content. Alternatively an opaque black box may be imposed over objectionable or confidential content, thus obscuring this objectionable or confidential content from being seen by the recipient of the final outgoing document (218).

The signature web server (web server) can store a record of these user annotations as they sequentially arrive from the user. This allows the system to easily track changes, and easily undo the latest changes in order in case the user wishes to undo the latest changes.

The signature web server (web server) will electronically merge or combine the various image layers creating a composite document image (216) that can be sent to the user's web browser (204). Thus from the user's perspective, assuming a good internet connection, the user simply appears to be editing the document as if the user was using a standard locally based image manipulation program, rather than actually manipulating the appearance of the document (216) on the remote signature server (200).

Note that the actual original document image (210) need not be actually altered at any time during this process. This allows the user to completely undo all of his or her alterations, and also allows the original document image (210) to be reused multiple times for different purposes as desired. Thus for example, a merchant may upload various gift card templates as various original document images, and allow an ecommerce customer to select a suitable gift card template for additional annotation.

Although the original document image (210) may be preserved unaltered, in some embodiments, in some embodiments, it may also be useful to give the remote user(s) (204), (206), (208) an ability to at least alter the brightness and contrast of the original document (210) through the use of controls located on the user's local web browsers. Additionally the original document may be cropped, rotated, sharpened, undergo color conversions (e.g. color to black and white grayscale, or color to black and white 1-bit images), color adjustments and other alterations as needed, in some cases producing a modified version of the original document image (211) that can be the basis for subsequent user annotation and signatures.

When the user is satisfied with the annotations and/or signatures, the user can inform the signature web server (web server) (200) to accept the final merged annotated document image (216), and to transmit the final annotated document image to a user specified recipient or destination (218).

These annotated document images (216), (218) can be transmitted to a designated recipient by many different means. For example, the original user (204) may wish to simply print his or her own copy by issuing a print command from the web browser running on the user's computerized device (204). Alternatively the user (204) may direct a different user (206), (208) to print from their device. Other methods include downloading a digital image file, such as a PDF file, from a web browser running on a computerized device (204), (206), (208), transmitting an analog or digital fax signal to a third party fax, fax server, or fax service such as eFax (202), transmitting an email to a third party email account, transmitting an email attachment to a third party email account (202), uploading to a third party server (203), physically mailing a hard copy to a third party, or storing a electronic copy of the annotated document image on the signature web server database (201).

An additional advantage of the virtual image layer approach is that in addition to the fact that the original document image can be stored in the signature web server in an unaltered form, the various annotation layers, such as the text annotation layer (or various elements of the text annotation layer) and the image annotation layer (or various elements of the image annotation layer) can also be stored on the signature web server. This allows frequently used annotation components, such as signature images, to be stored on the signature web server and be reused for different documents, as will be discussed later.

In some embodiments, different users (e.g. (204), (206), and (208)) may log onto the signature web server as individuals, and will not exchange documents between users. However in other embodiments, a user can also share a document (with annotations) with another user to support collaborative edits/annotations or sequential edits between users.

For example, consider a form that has to be filled out by multiple parties, such as an application form for an athletic scholarship. Here a student (204) may first fill out the personal details, a parent (206) may then complete another section authorizing participation, and then one or more coaches (208) may complete the application form with additional information before the form is finally submitted. The invention supports this type of collaborative edits/annotations between multiple users.

This collaborative edits/annotation feature is particularly useful for as in group practices, business, and the like, where multiple users (e.g. (204) and (206)) may sign up under a group account and all may have common access to the same set of documents.

Additionally, the signature web server may impose various levels of security and restricted access as desired. This can be done by standard techniques, such as by use of passwords, identification keys, biometric methods (e. g. fingerprint scanners) and so on.

In other embodiments, "signatures" per se need not be entered, but the same methods may be used to create various other types of documents, often from various preloaded templates. These other embodiments will be discussed shortly.

Examples

Figure 3:
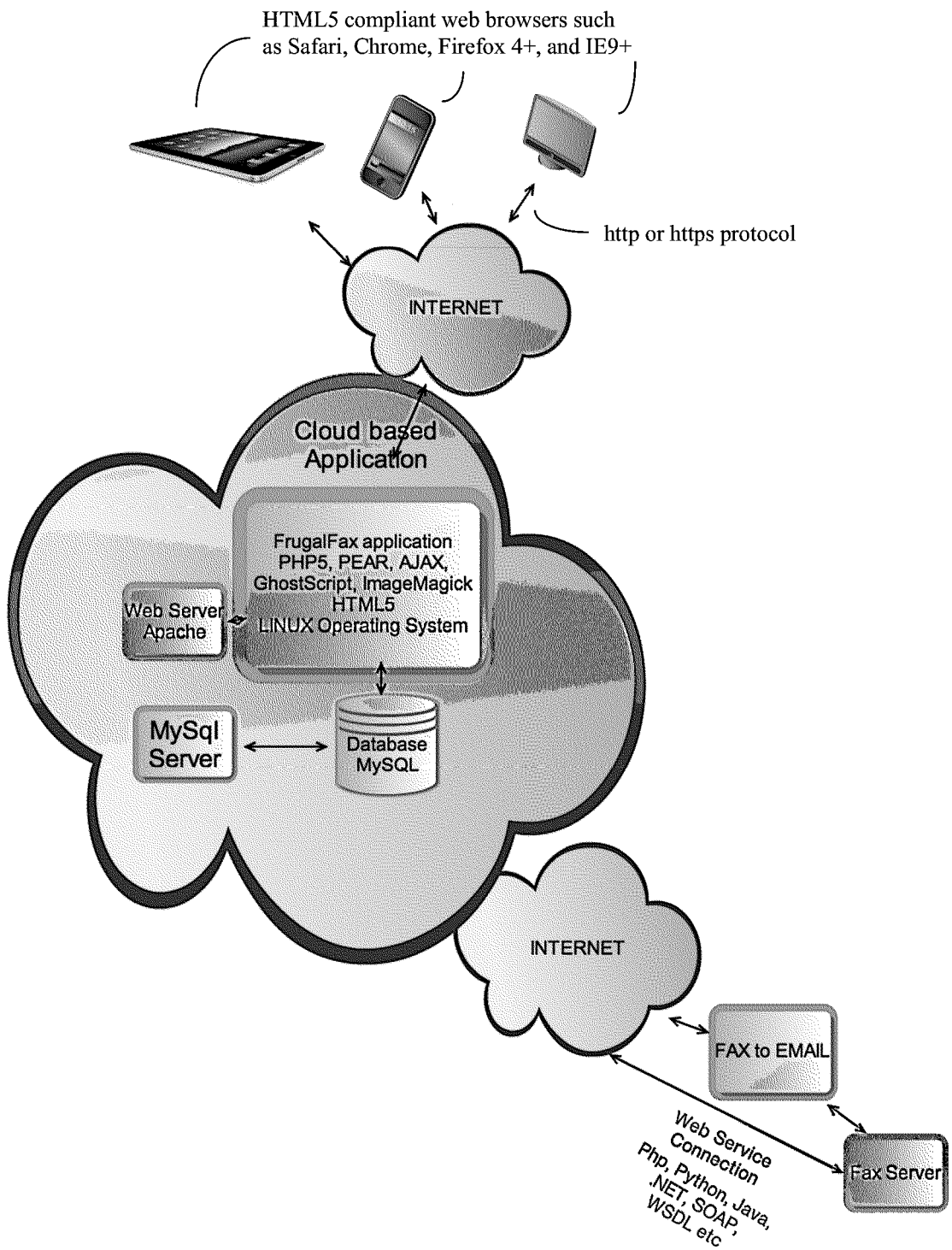
FIG. 3 shows a diagram showing some of the variety of different computerized devices with HTML-5 capable web browsers that can use the invention, as well as some details of the software used to implement one embodiment of the invention's methods on the signature web server.

A first prototype version of the invention's methods was implemented in software residing in computer memory running on one or more computer processors, typically x86 or ARM processors, running on one or more Internet connected web servers. This type of configuration is often referred to as a cloud based application. The prototype was designed to run under an Apache web server, and was encoded as a series of PHP5, PEAR, AJAX, Ghostscript, ImageMagick and HTML5 scripts, applications, and code. The web server in turn ran under the Linux operating system. The system stored and retrieved document images and data on a database under the control of MySQL database management software. A diagram of this configuration is shown in FIG. 3.

This first prototype system was called "FrugalFax", and this embodiment of the invention will occasionally be referred to in the alternative in this disclosure as the "FrugalFax" method or system.

As will be discussed, other embodiments of the system, disclosed in parent application Ser. No. 14/231,025 and 61/807,214, the complete contents of both of which were incorporated herein by reference, implemented the invention's methods in the form of an ecommerce system, more specifically an ecommerce system for ordering flowers, that also allowed the ecommerce customers to create custom gift cards.

Figure 4:
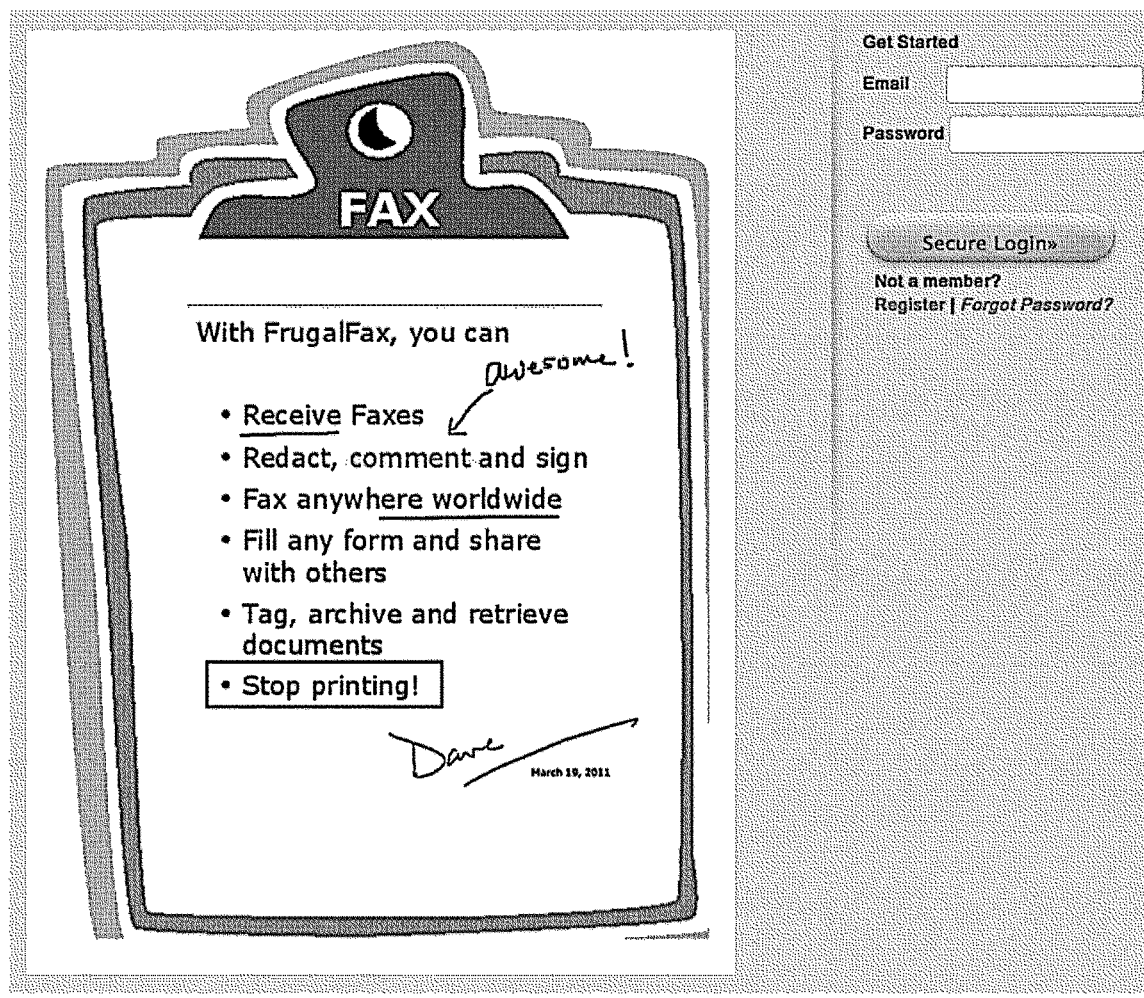
FIG. 4 shows an example of the invention's login screen.

Users typically interact with the FrugalFax system by logging on from their local web browsers or apps running on their local computerized devices (204), (206), and (208). As is shown in FIG. 3, these local computerized devices can be various types of devices, including various devices such as computerized tablets (e.g. iPad or Android tablets), smart phones (e.g. iPhone or Android smart phones), desktop or laptop computers, and the like. An example of a typical type of login screen, which also discusses some of the invention's features, is shown in FIG. 4.

Figure 5:
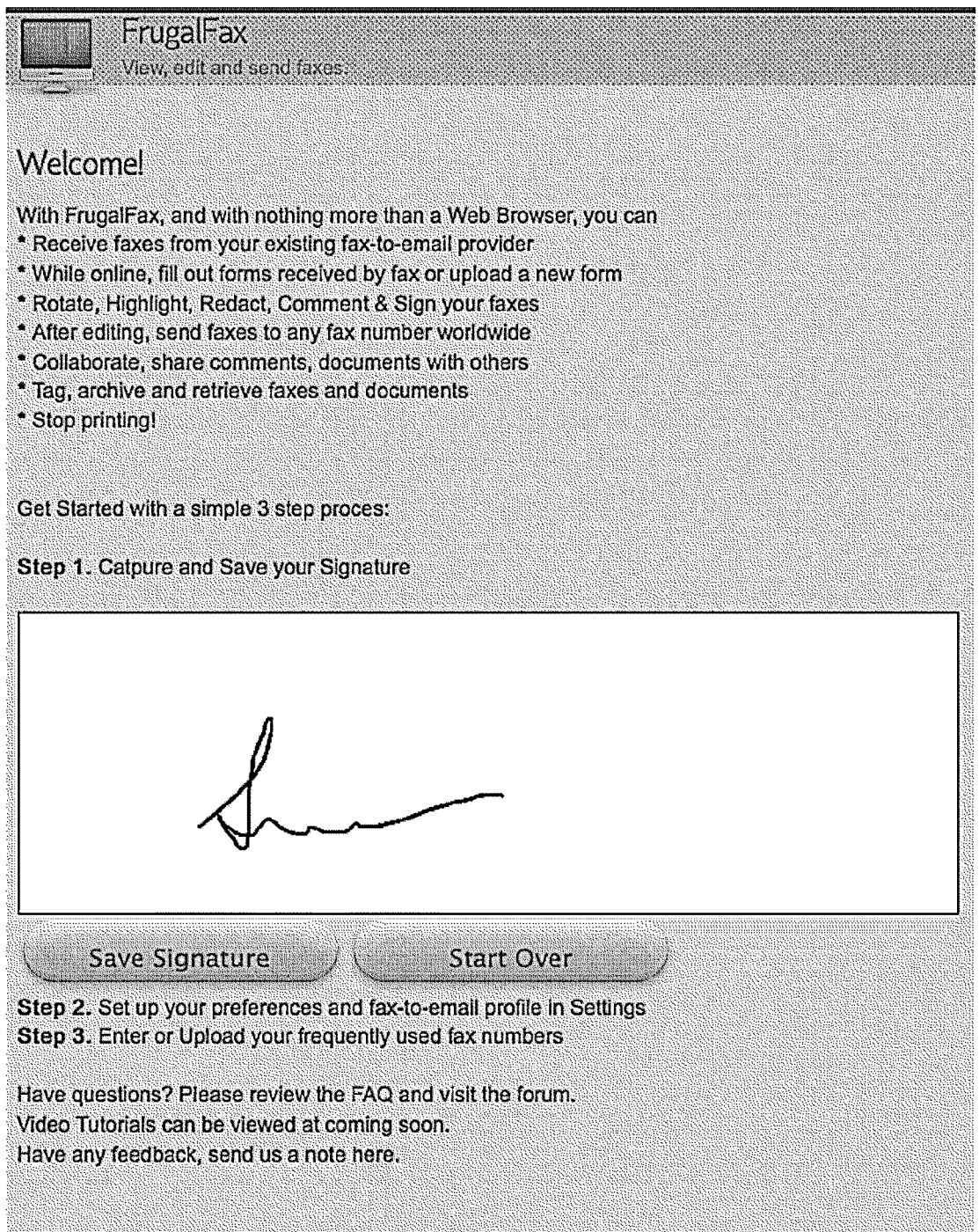
FIG. 5 shows an example of a signature capture process.

As previously discussed, one of the most commonly used document annotations is a signature. Although the user may sign each document on a one at a time basis by, for example, moving a mouse to draw a signature on the screen of the user's web browser, often it will be more convenient to upload and store a signature on the signature web server that can be used multiple times. To do this, the user can either upload an image of his or her signature, or alternatively the system can capture the user's signature by mouse movements, as is shown in FIG. 5. FIG. 5 also discusses some of the invention's other features.

Figure 6:
FIG. 6 shows an example of the invention's configuration screen.

Often this signature capture is done during an initial user configuration and customization process. This configuration and customization process will also often prompt the user to enter in his or her Fax-to-Email provider, email settings, and other data, as is shown in FIG. 6.

Once the system is configured, the user may then use his or her web browser (204), (206), (208) or app to direct the signature web server (web server) (200) to process a particular document. In this example, the user has directed the signature web server (200) to use a copy of a document that is residing on the signature web server's local database (201). As can be seen, the signature web server (200) sends HTML data and other data to the user's web browser to create a local user interface that somewhat resembles the user interface of a common software drawing program (700). In this example, the user is able to scroll or rotate through a view of multiple document pages (702) at the same time, and select one page (704) as the present focus of interest and manipulation. This page is shown magnified as (706).

The web browser based user interface can provide buttons to manipulate the brightness and contrast of the original document image (708). Other buttons (710) can be used to apply the signature image previously uploaded in FIG. 5. Still other buttons can do standard drawing commands (e.g. lines, squares, move annotation elements, zoom in, zoom out, add text, draw freeform, erase), and these are shown in (712). In this example, the user has used a drawing tool to make some scribbles on the document (714) simply to illustrate that such an annotation is possible. Keep in mind that these scribbles are actually being stored in the image annotation layer (214) in the remote signature web server (200), are being merged by signature web server (200) to create a combined annotated document image (216), which is then being shown on the user's local web browser (204).

Figure 8:
FIG. 8 shows how a remote user may instruct the signature web server to upload a document (here an IRS tax form) from a third party server (here an IRS server) to the invention's signature web server.

FIG. 8 shows how a remote user (204) may instruct the signature web server (200) to upload a document (here an IRS tax form) (210) from a third party server (203) to the invention's signature web server (200). In this example, the invention's ability to sign documents is being illustrated by uploading a PDF of an IRS tax 1040EZ form from an IRS web server (203). To do this, the user may simply enter in the URL of the document. The user may additionally tag the uploaded document with additional metadata, such as at least a brief descriptive tag, which will facilitate later storage, sorting, retrieval and database searches that may be conducted on various documents stored in signature web server database (201).

Figure 7:
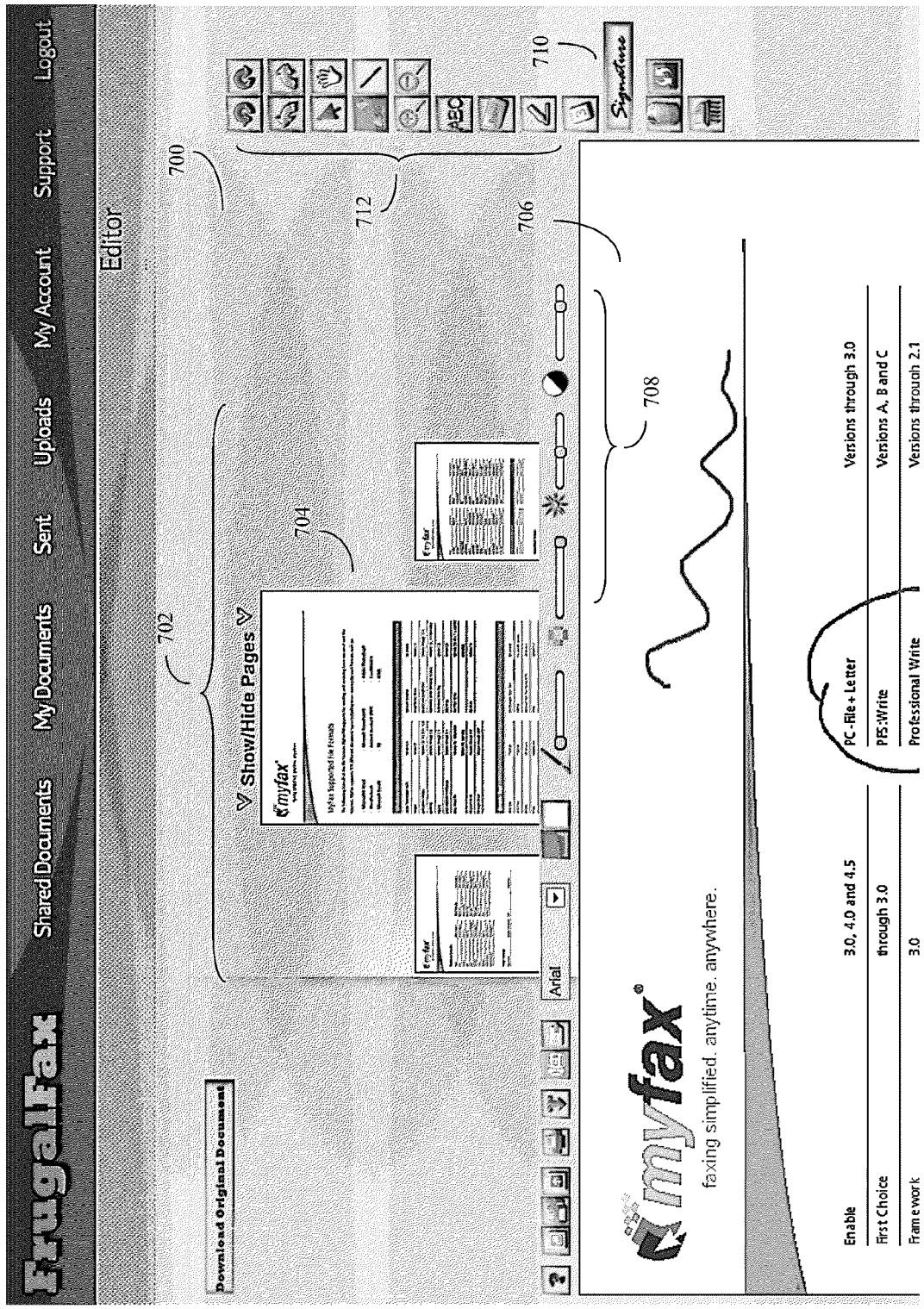
FIG. 7 shows an example of the web-browser based user interface for the invention, as seen by a remote user accessing the invention's signature web server over the Internet. Here the user can scroll or rotate through a number of document pages at once, and select a suitable page for signing and annotating. In this example, the user has used the invention's annotation capability to scribble on the document.
Figure 9:
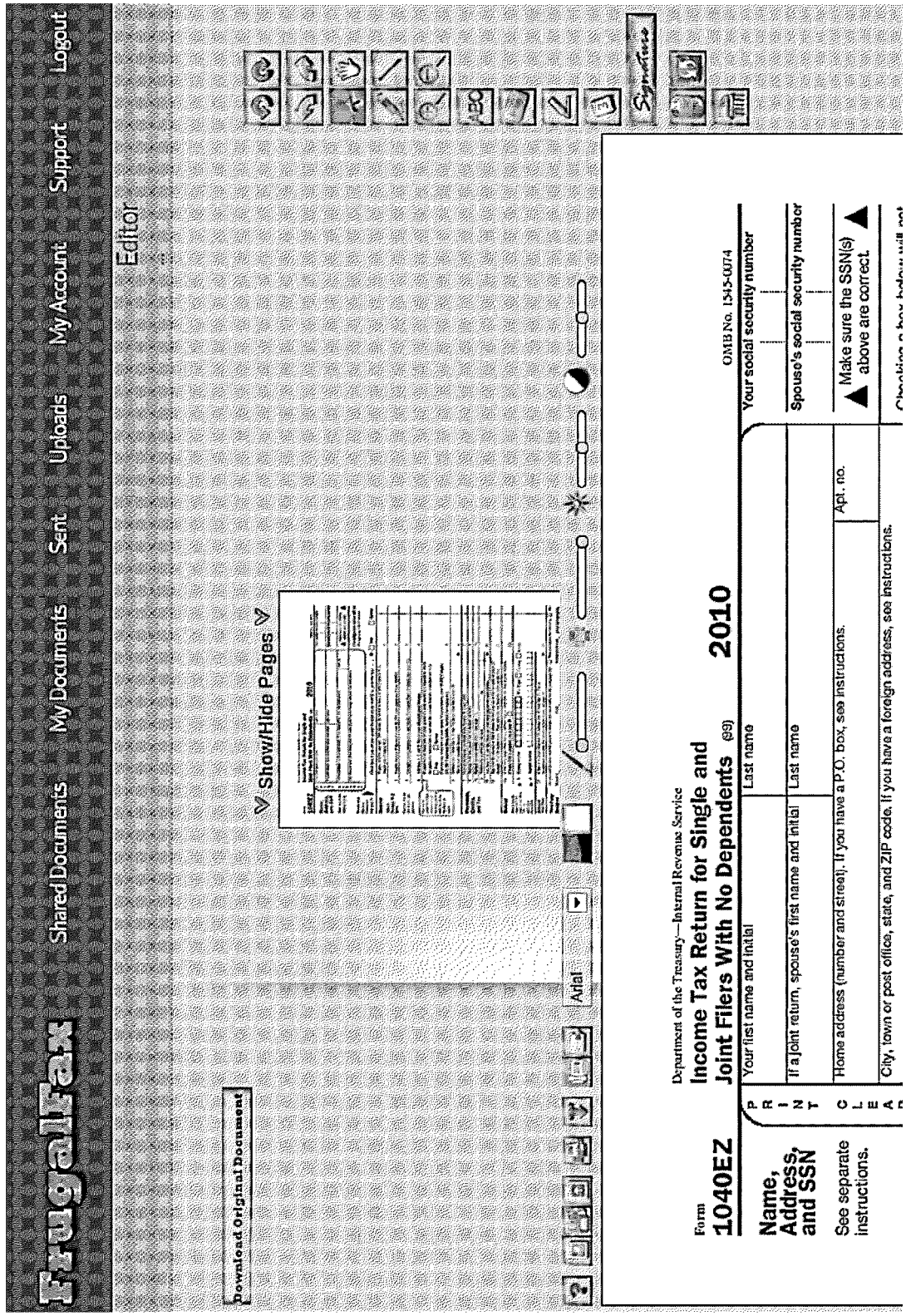
FIG. 9 shows a close up of the IRS tax form, which has now been loaded into the invention's remote web server (e.g. signature web server), and now being shown in the web browser or app of the user's local computer or computerized device, along with various web browser or app based annotation tools.

FIG. 9 shows a close up of the IRS tax form, which has now been loaded into the invention's remote signature web server (200), and is now being shown in the web browser of the user's local computer or computerized device (204), along with various annotation tools, in a manner similar to that previously shown in FIG. 7.

Assume for this example that the user has used the system's text annotation function to previously add text to the otherwise simple and passive image of a 1040EZ document. That is, assume that this document is not otherwise capable of receiving text, and that the user has used the text tool to create text in a text annotation (212) layer on signature web server (200) that corresponds to the user's tax status (not shown). As a final step, the user now wishes to sign the document using a previously uploaded signature.

Figure 10:
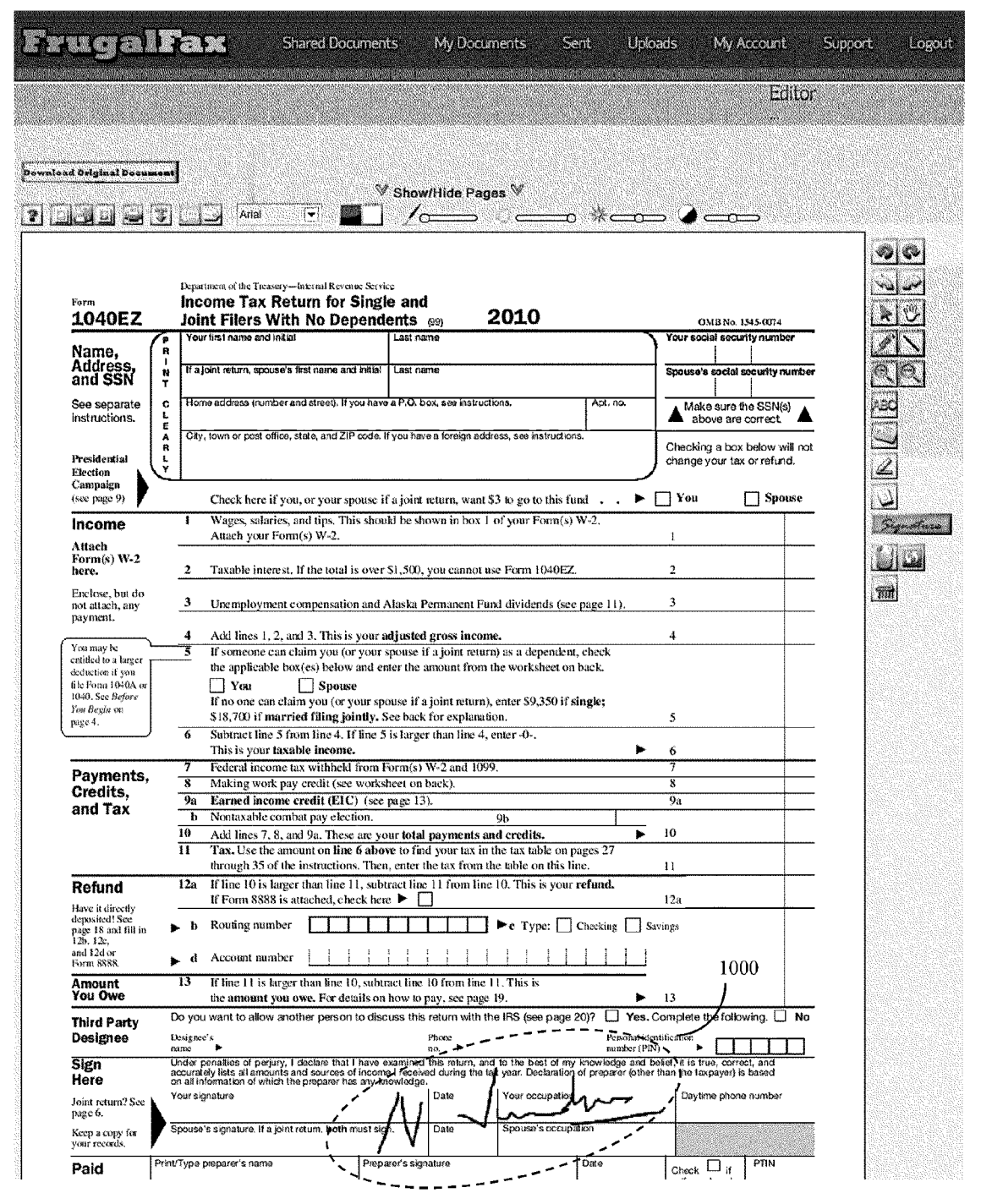

To do this, the user may first insert an image of the previously uploaded signature using the signature button (1000), and then manipulate the signature into the correct position using an appropriate move button and appropriate mouse movements (or touch screen movements). This is shown in FIG. 10. The user may also rotate and resize (i.e. enlarge, shrink) the signature image as needed to fit in the proper space.

Figure 11:
FIG. 11 shows the user signature in the correct place in the IRS tax form. Additionally, the user has annotated the IRS tax form with a date as well.

FIG. 11 shows the user signature now resized to the correct size, and positioned in the correct place in the IRS tax form (1100). Additionally, the user has annotated the IRS tax form with a date as well (1102) using some of the other web browser image manipulation buttons.

Software Flow Charts

Software flow charts showing one way to implement FrugalFax embodiment of the invention is shown in FIGS. 12-16.

Figure 12:
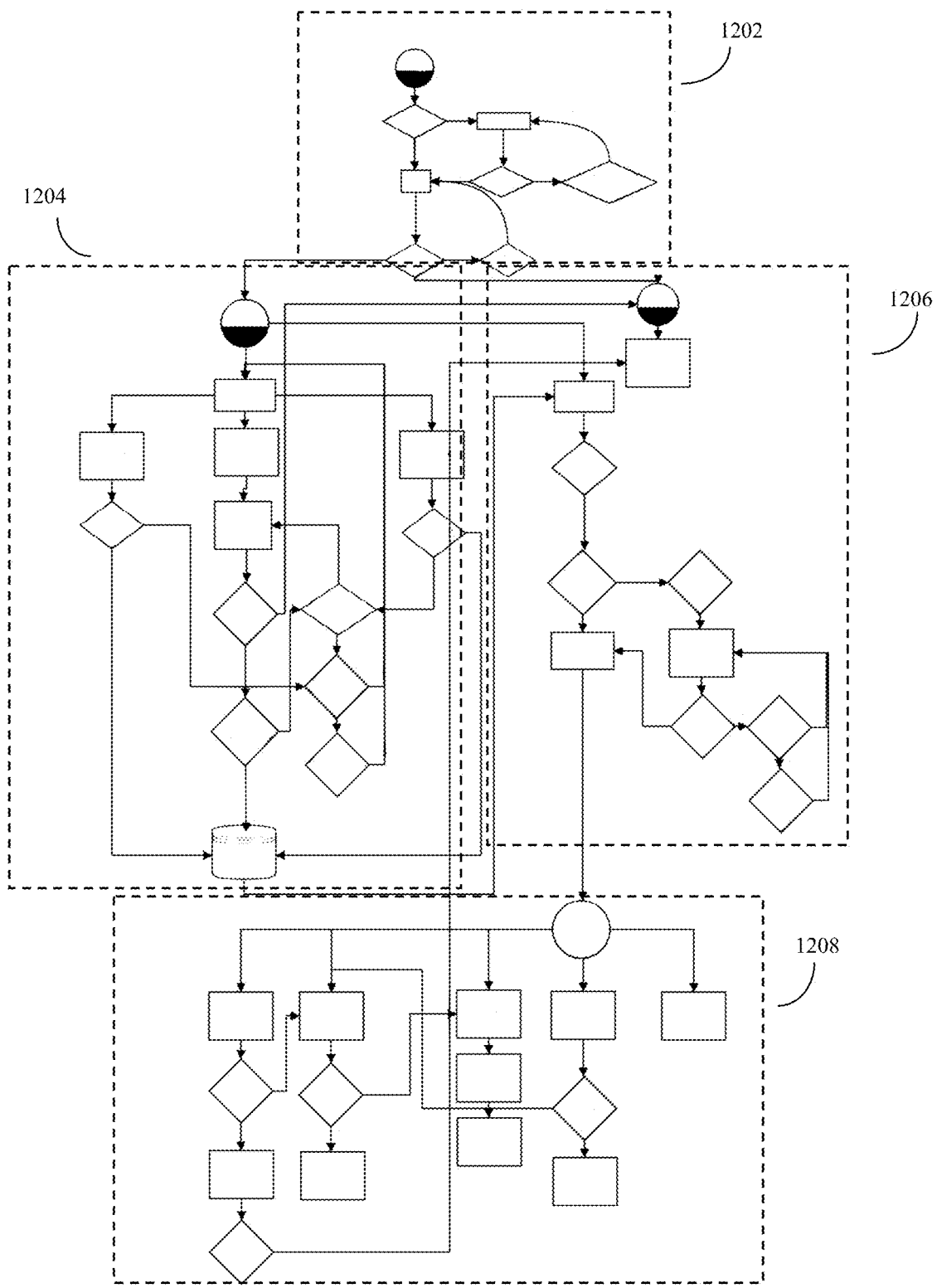
FIG. 12 shows an overview of a software flow chart showing one embodiment of the invention.

FIG. 12 shows a top level overview of a software flow chart showing one possible embodiment of the invention. Here flow chart section (1202) roughly corresponds to the FrugalFax embodiment's initial sign-on and registration steps, shown in more detail in FIG. 13. Section (1204) roughly corresponds to the FrugalFax's document importation steps shown in more detail in FIG. 14. Section (1206) roughly corresponds to the FrugalFax email communications management steps shown in more detail in FIG. 15. Section (1208) roughly corresponds to the FrugalFax embodiment document management and exportation steps, shown in more detail in FIG. 16.

Figure 13:
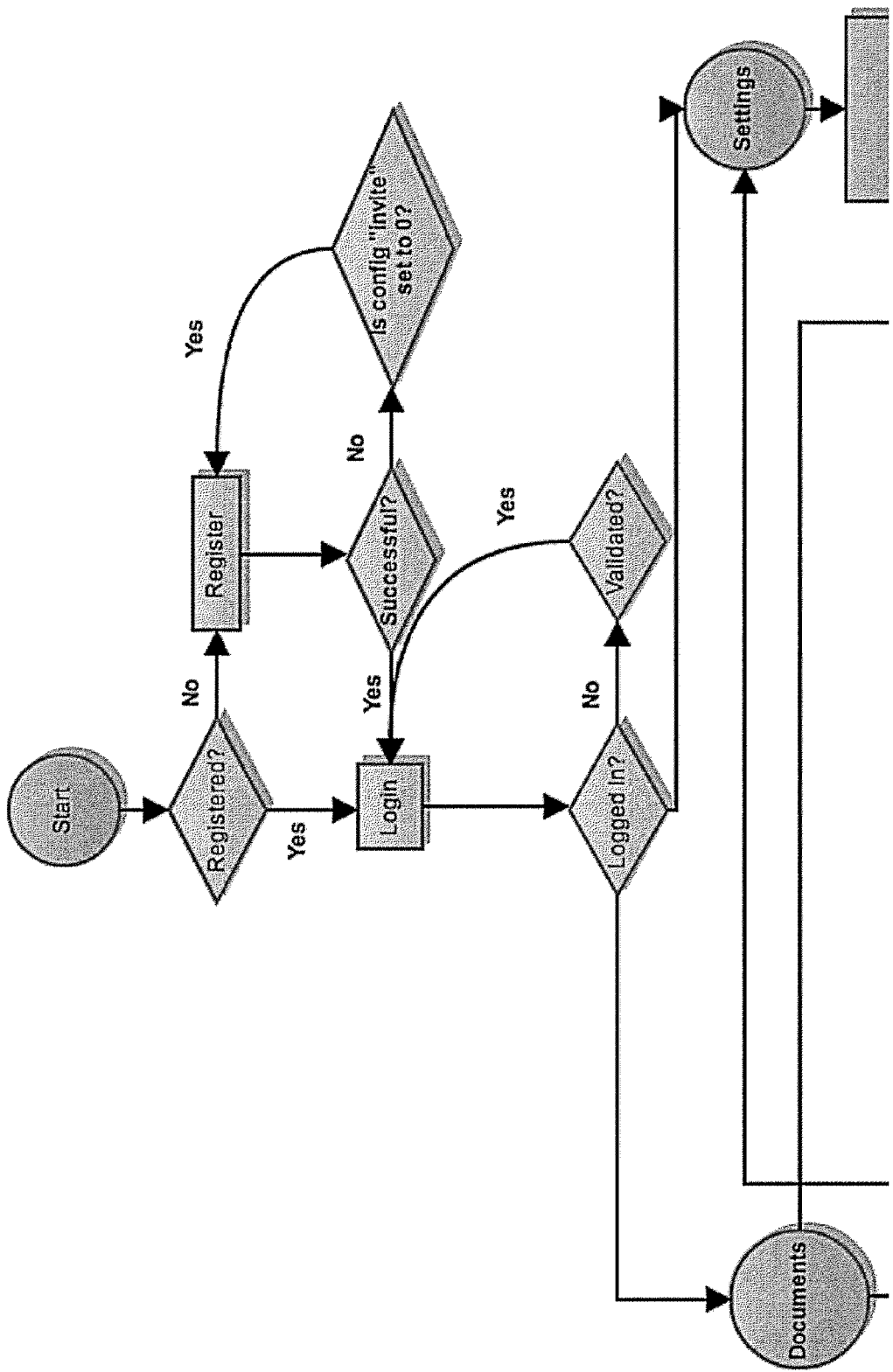
FIG. 13 shows a close-up of one embodiment of the invention's initial sign-on and registration steps.

FIG. 13 shows a close-up of one embodiment of the invention's initial sign-on and registration steps, previously shown as (1202)

Figure 14:
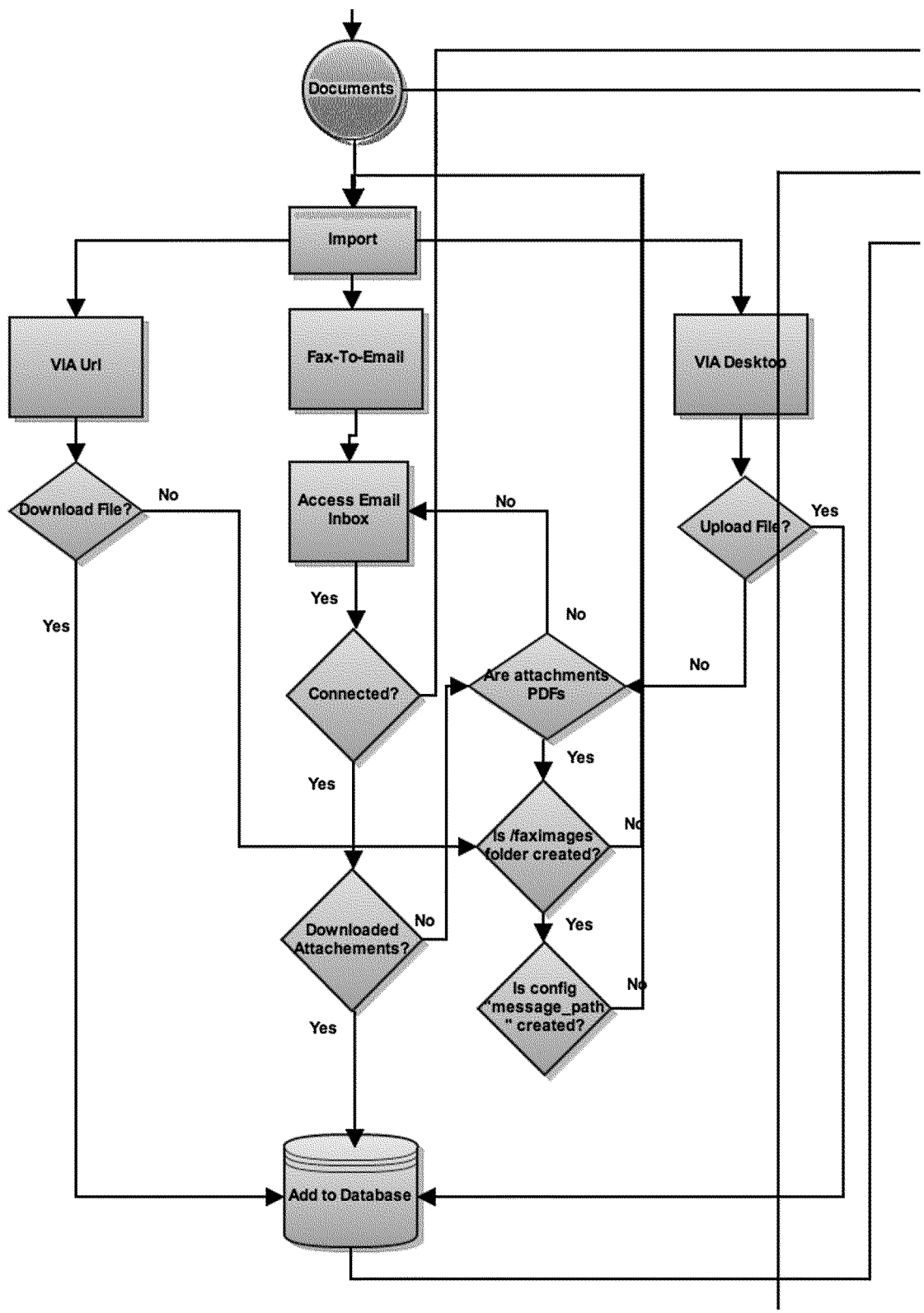
FIG. 14 shows a close-up of one embodiment of the inventions' document importation steps.

FIG. 14 shows a close-up of one embodiment of the inventions' document importation steps, previously shown as (1204).

Figure 15:
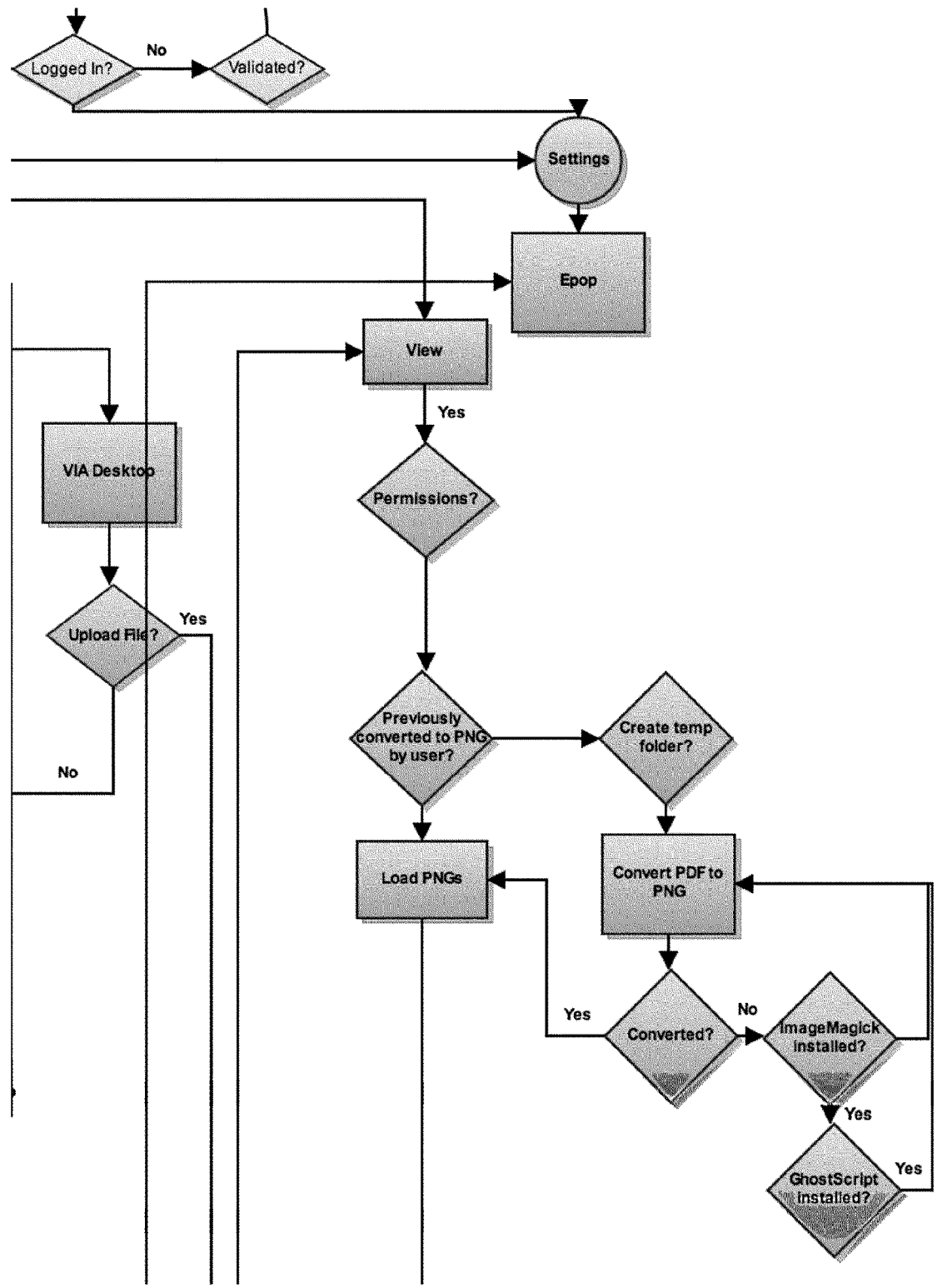
FIG. 15 shows a close-up of one embodiment of the invention's email communications management steps.

FIG. 15 shows a close-up of one embodiment of the invention's email communications management steps, previously shown as (1206).

Figure 16:
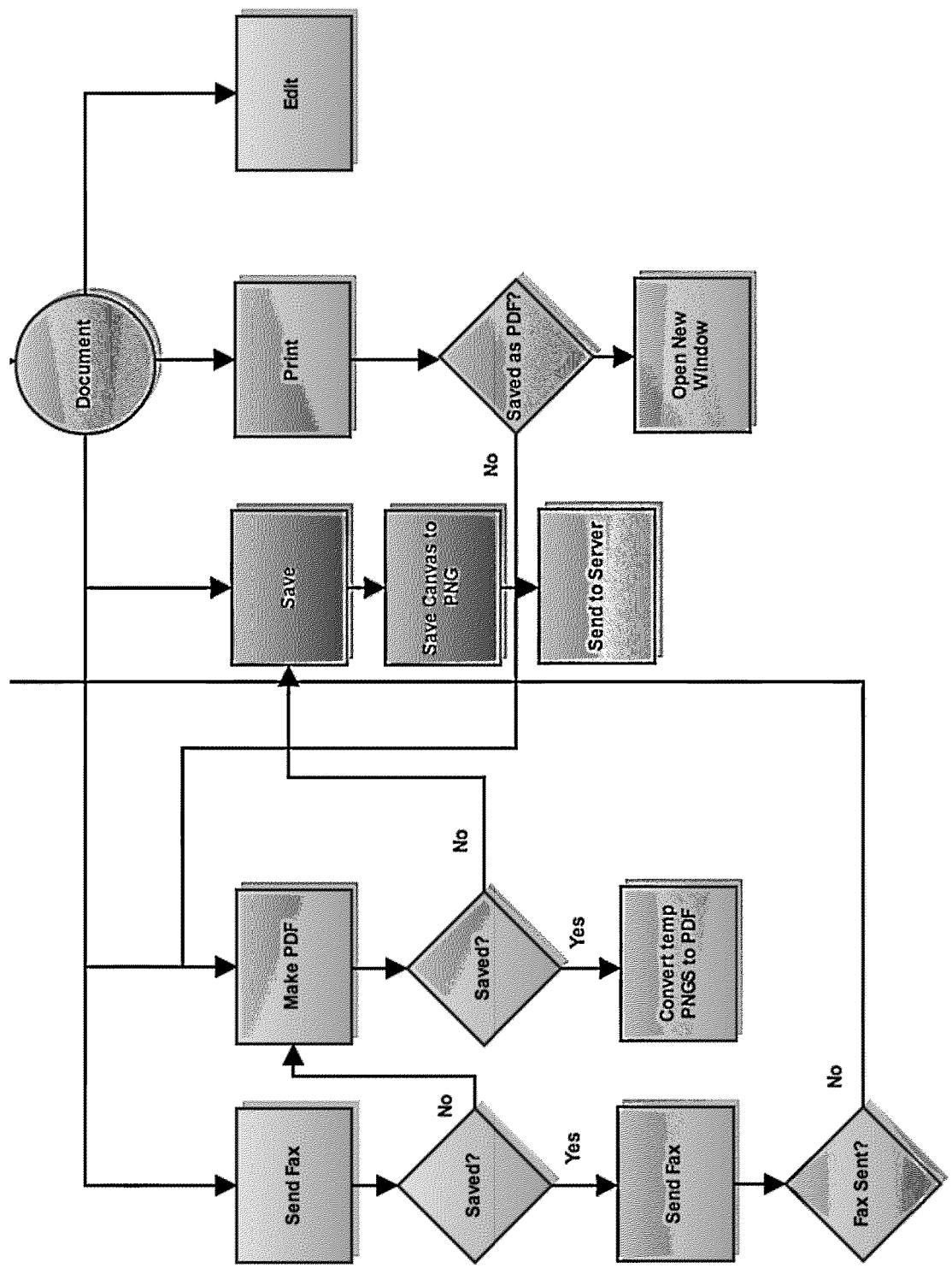
FIG. 16 shows a close-up of one embodiment of the invention's document management and exportation steps.

FIG. 16 shows a close-up of one embodiment of the invention's document management and exportation steps, previously shown as (1208).

Thus by using the invention, users can manage faxes and other documents using only a computerized device equipped with an Internet connection, and a web browser. Preferably this web browser should have some or all of the functionality of modern HTML5 compliant browsers (204), (206), and (208). Suitable web browsers include popular browsers such as Safari, Chrome, Firefox, Opera and IE9.

In some embodiments, a user who also subscribes to fax-to-email services such as eFax, MyFax, Smartfax, Faxaway and numerous others, may download and view their fax messages in a standard web browser by way of the invention's signature web server (200).

Using the invention, the user may perform functions such as rotating, viewing and printing incoming faxes. The user may also comment on a fax or annotate a fax within the web browser (204), (206), (208) using freehand drawing and text tools. The user may highlight sections of the fax with highlighting tools (e.g. coloring an area with a transparent yellow color), or alternatively redact sections (e.g. coloring an area with a non-transparent black or white color) as needed. The user may also stamp his or her signatures, date the document, or write custom messages anywhere on the document.

Additionally the user may upload and fill any PDF or other type document form or other without the need for extra software. The user may share his or her faxes and documents with anyone. The user may also reply by Fax or Email directly from the same unified environment of the user's web browser. The user may also tag and archive (save to database) faxes for future retrieval from any web browser. Finally, using the web browser and the internet, the user may also access faxes from any geographical location.

Additional Embodiments

Although in many embodiments, the computer memory storing the various documents will reside on a web server, and although the application software running on the computerized device will often be a web browser, such as an HTML 5 capable web browser, this need not always be the case. In alternative embodiments, the computer memory storing the various documents may reside on other types of computer memory, either local to the computerized device, or alternatively connected via a remote telecommunications connection such as the Internet or other electronic data connection.

Automatic sorting of incoming document faxes: Often various uses and businesses have a need to sort incoming faxes according to the identity of the original fax sender. For example, in a medical practice, some incoming faxes may come from a radiologist sender; other faxes may come from a cardiologist sender, and so on.

In some embodiments, the system may examine either the incoming fax telephone numbers, and/or the fax Called Subscriber Identification (CSID) text string data, and use the system processor to automatically compare this incoming fax data with a file (e.g. a user defined database table) or list of known fax sender identities. The system can then assign the incoming fax to this identity, and either store the incoming fax in an appropriate identity linked file or file folder in memory, or alternatively file this incoming fax in an appropriate identity linked entry in a database in memory.

An example of the user interface display from such an automatic fax filing system is shown in FIG. 17. Here a list of incoming faxes is shown in (1700), and a previously established list of folders, each representing a different sender, is shown in (1702).

Splitting larger fax files into smaller messages: The medical practice example previously discussed in FIG. 17 is also serves as a good example to illustrate a second problem as well. Often fax senders send multiple unrelated documents as a single fax file. For example, it is common for a medical practice to refer multiple patients to a particular radiologist or cardiologist, and these particular radiologists and cardiologists in turn may often decide to send reports back on multiple patients as a single large fax transmission or file.

As a result, often it is also useful to design the system so that the different portions of the larger incoming fax file, which correspond to different fax reports from the different patients, be easily split into smaller files which can then be filed or stored in a database separately.

Figure 18:
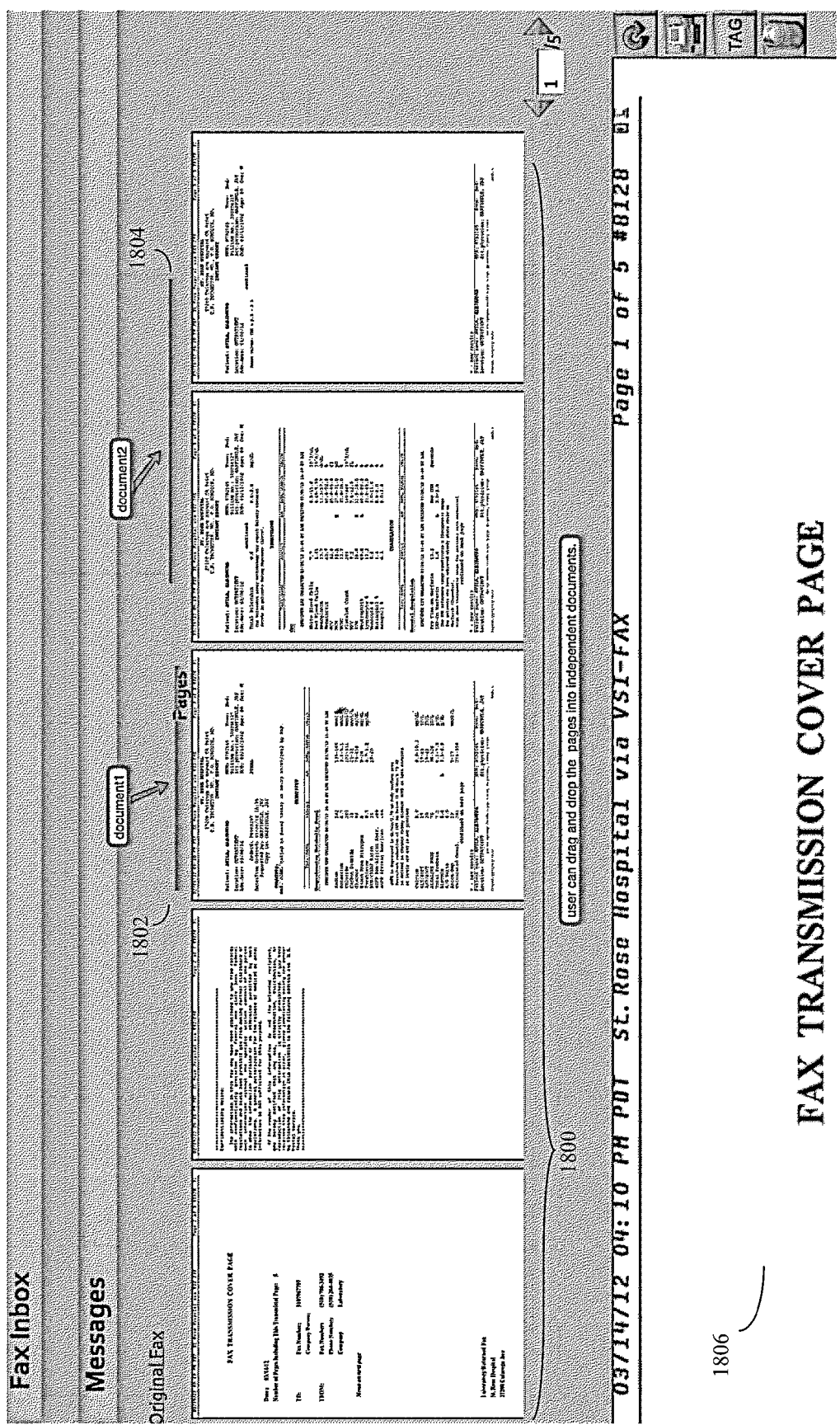
FIG. 18 shows an example of how a larger incoming fax file, which may contain a plurality of different messages, may be split into smaller files (often on a per message basis) and filed accordingly.

FIG. 18 shows an example of how a larger incoming fax file, which may contain a plurality of different messages, may be split into smaller files (often on a per message basis) and filed accordingly. In (1800), a larger original fax is displayed on system's graphical user interface, and the user can then view the pages, and drag and drop the pages into independent documents. Here for example, (1802) is one independent document; while (1804) is a different independent document. The first page of this large fax is shown in larger size as (1806).

Touch sensitive tablet embodiments: In some embodiments, the system may be implemented on a tablet computer (exemplified by the popular Apple Computer iPad), or on a Smartphone. Although such devices may use a web browser, such as an HTML 5 capable web browser previously discussed to implement the method, other programs may also be used. In particular, it may be useful to create tablet or Smartphone specialized "app" versions of the software that, although still HTML 5 capable, will be customized to better make use of the unique aspects of tablet computer graphical user interface, such as their multitouch capability, and general use of fewer separate buttons and other user controls.

One such embodiment, called the "SecureSign" application (app), was submitted by applicant and published on the Apple iTunes store on Apr. 4, 2012. As applicant described this system:

"Ever find the need to sign a document and forward to someone else? SecureSign allows access to PDF attachments received by email for annotation and signature. There is no limit to the number of documents that you can sign with this App. You can create custom stamps for frequently used phrases and for signatures."

This tablet embodiment often operates by receiving documents as email attachments, or from various web services. Once signed or otherwise annotated by the tablet computer user, the annotated document may then be transmitted to its intended recipient by various means, such as email attachments, fax, or to a web service adapter.

Figure 19:
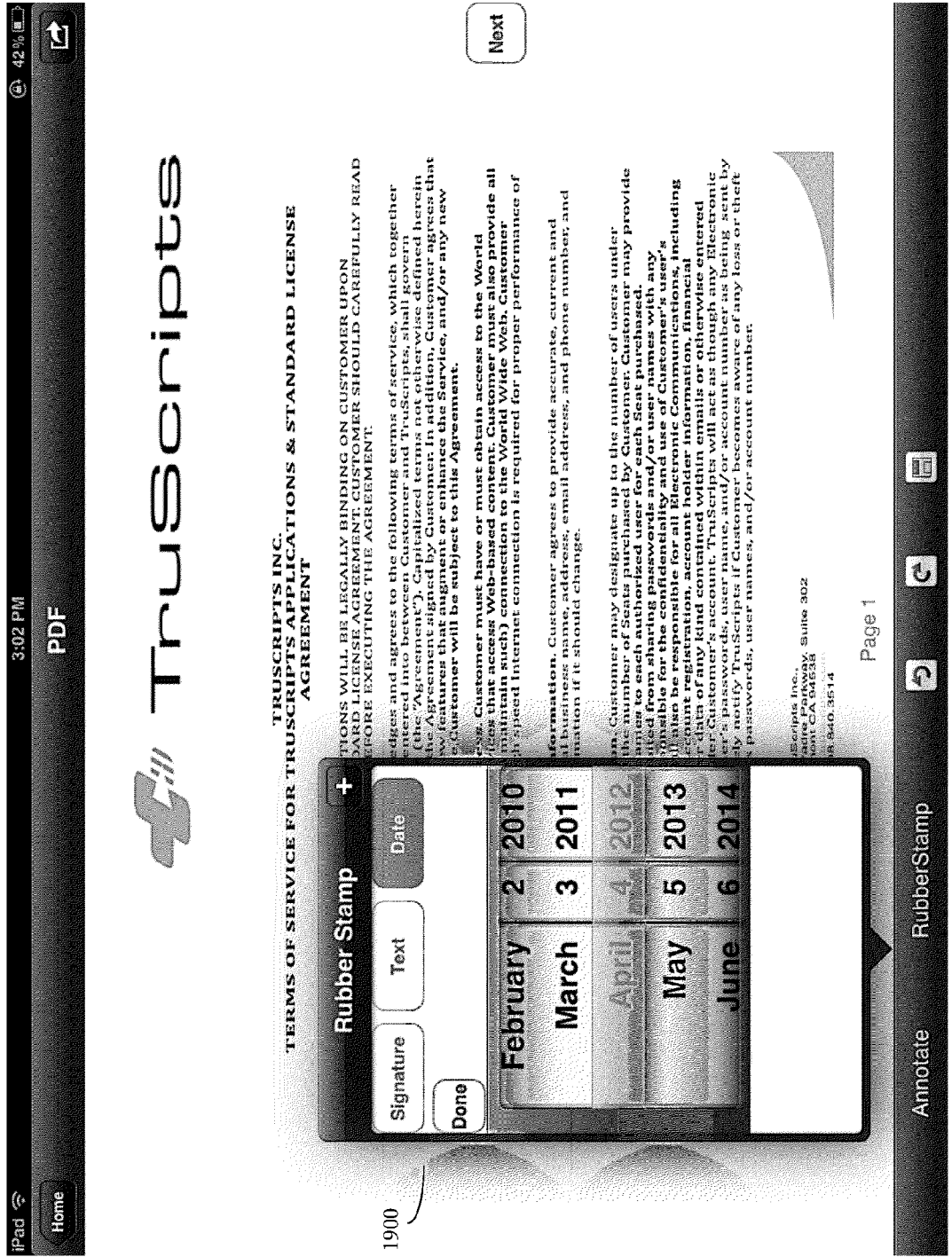
FIG. 19 shows an interface from a tablet (iPad) version of the system. Here use with tablet computers can be facilitated by the use of a "rubber stamp" interface, optimized for touch screen systems, that allows the user to define various electronic "rubber stamps" for dates, signatures, text, or other functions and then use the touch interface to apply the appropriate "rubber stamp" over the representation of the document on the screen. Here the user is setting the date for a date rubber stamp.

FIG. 19 shows a graphical user interface display screen from this tablet (iPad) version of the system. Here use with tablet computers can be facilitated by the use of a "rubber stamp" interface. In essence this rubber stamp system operates by first allowing the user to define a data structure, here called the "rubber stamp" that defines graphical content that the user wishes to electronically place (e.g. stamp) onto the document. The rubber stamp data structure can be a graphic (e.g. a signature), or text (often with a defined font), or a data field (such as a date field). Thus the position of the data structure, relative to the underlying document, can be manipulated by the user. The user can also control other variables, such as the size of the ultimate imprinted text or graphic, angle of the text or graphic, and so on, merely by touching the "rubber stamp" and moving it about the touch sensitive screen. In a preferred embodiment, the "rubber stamp" will be designed to respond to multitouch gestures from two or more fingers, and thus for example expand, contract, or rotate as the user's fingers that touch the sides of the "rubber stamp" move accordingly.

Thus the system allows the user to define various electronic "rubber stamps" for dates, signatures, text, or other functions and then use the touch interface to apply the appropriate "rubber stamp" over the representation of the document on the screen.

Figure 20:
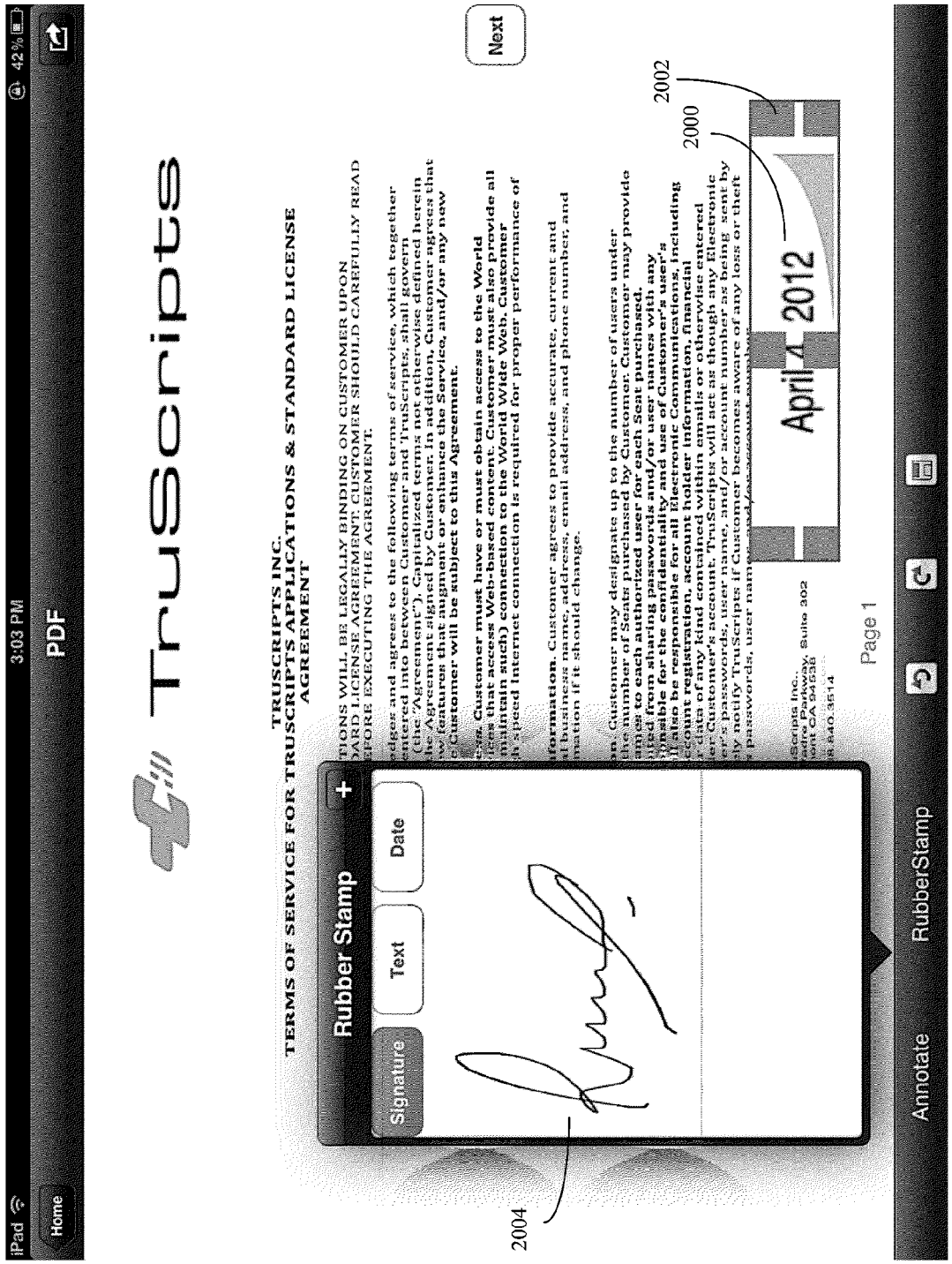
FIG. 20 is another view of the tablet interface, showing how after the user has manipulated the "date" rubber stamp to the appropriate location on the document, the user has then opened the "signature" rubber stamp.

In FIG. 19 (1900), the user is setting the date for a date rubber stamp, which will then be applied to the document in FIG. 20.

FIG. 20 is another view of the tablet interface. Here two things are happening. The first is that the user has now manipulated the "date" rubber stamp, previously defined in FIG. 19, to the appropriate location on the document (2000) and has also defined the size of the date text by adjusting the edges of the "stamp" (2002). Additionally, the user has also opened an alternative "signature" rubber stamp (2004), and is either entering the signature, or reviewing a previously entered signature, prior to applying the signature to the document, which is shown in FIG. 21.

Figure 21:
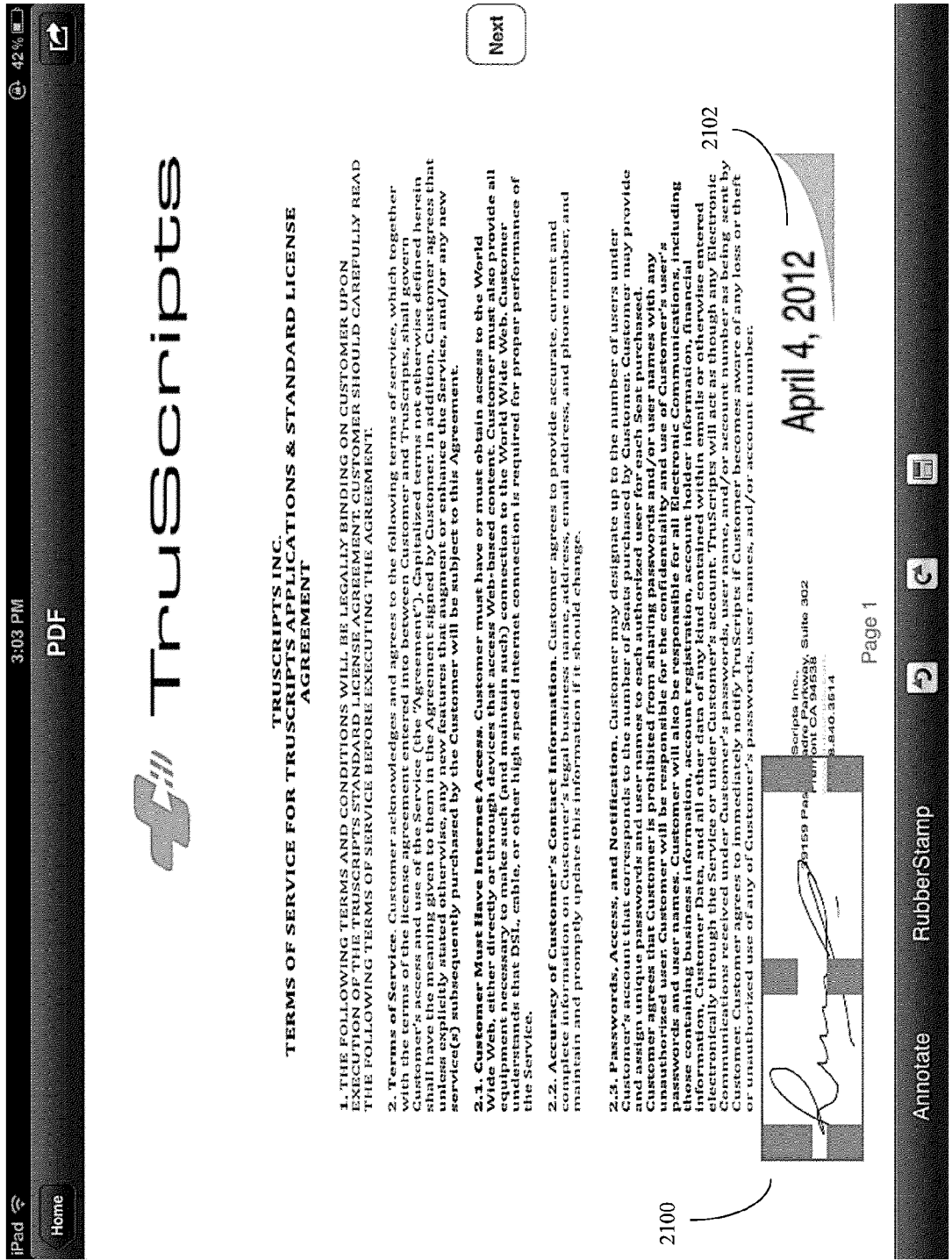
FIG. 21 is another view of the tablet interface, showing the user manipulating the "signature" rubber stamp to the appropriate location and size on the document.

FIG. 21 is another view of the tablet interface, showing the user manipulating the "signature" rubber stamp (2100) to the appropriate location and size on the document. Note that the date stamp (2102) previously applied in FIG. 20 is now finished and in place.

Figure 22:
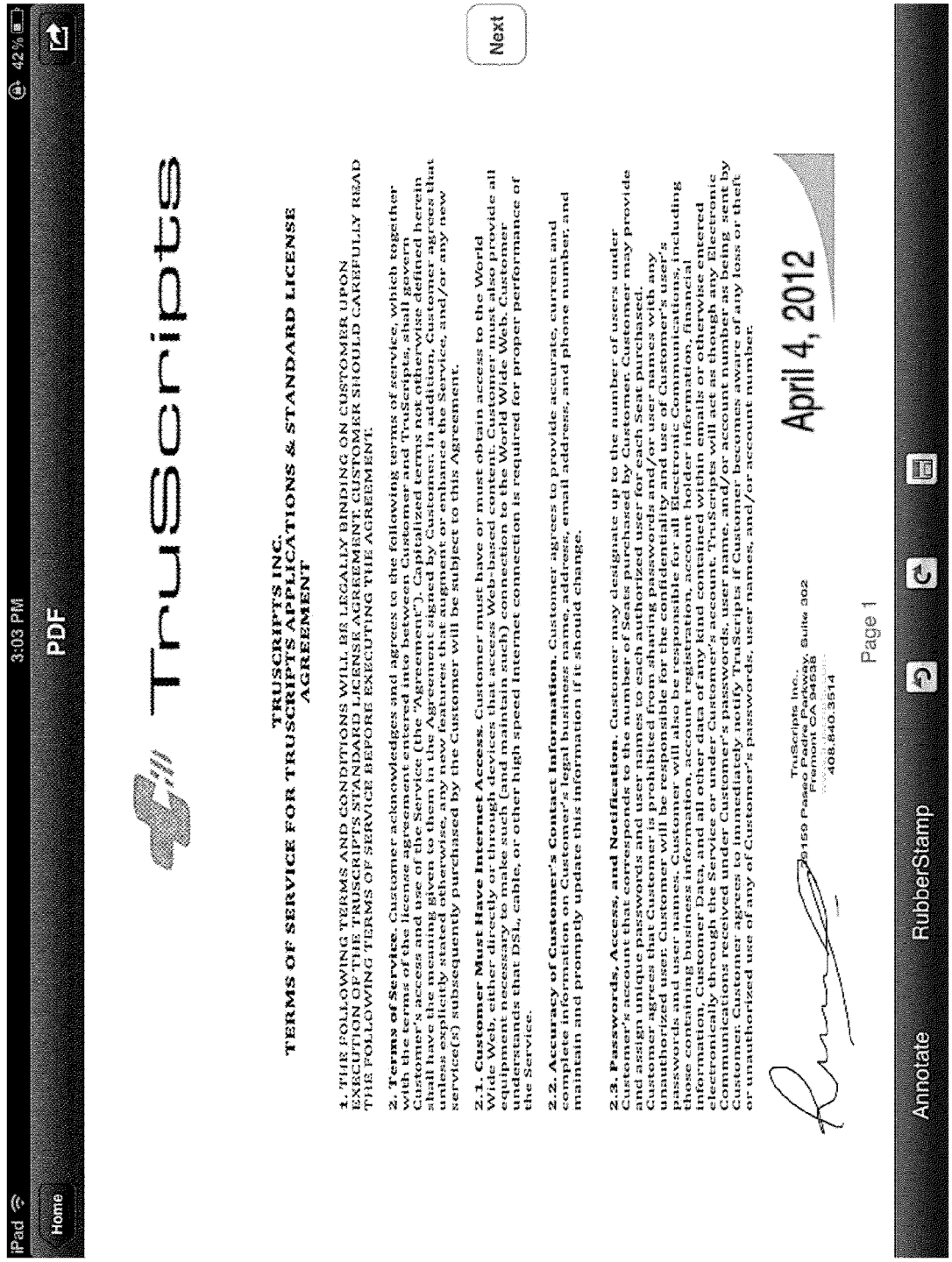
FIG. 22 is another view of the tablet interface, showing the final signed and dated document.

FIG. 22 is another view of the tablet interface, showing the final signed and dated document.

Use for Creating Gift Cards and Other Documents

Figure 23:
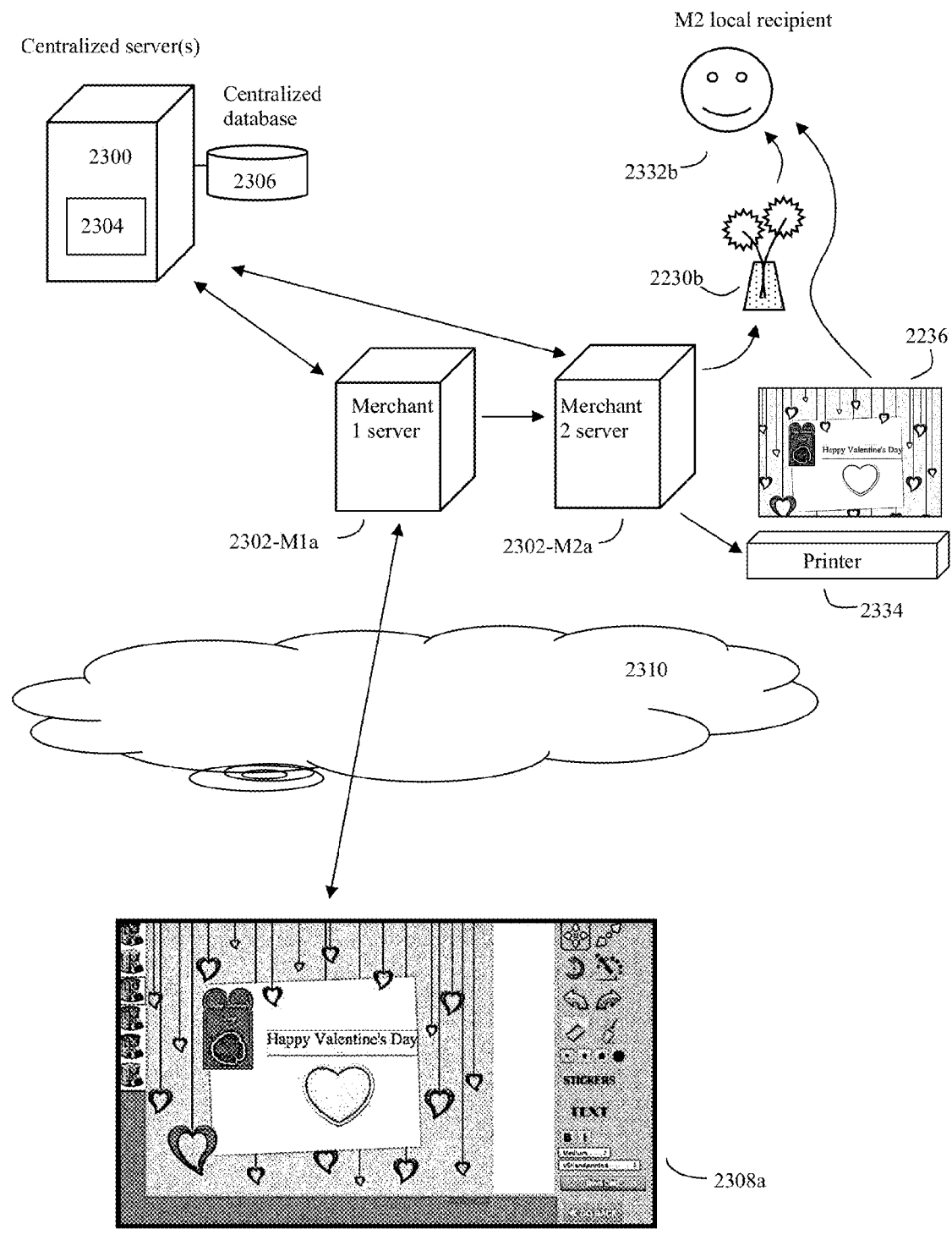
FIG. 23 shows an example of an ecommerce customer customizing the design of a gift card. The system can direct a remote merchant, who is responsible for delivery of the associated product, to print out and deliver the ecommerce customer customized gift card along with the ordered product.

In some embodiments, these methods may also be useful for allowing users, such as ecommerce customers, to create customized documents, such as gift cards, greeting cards, and the like using remote ecommerce websites. Here the methods of parent application Ser. No. 14/231,025 "METHOD FOR RAPID DEVELOPMENT OF SCHEDULE CONTROLED NETWORKABLE MERCHANT ECOMMERCE SITES" the entire contents of which are incorporated herein by reference, as well as application 61/807,214 the entire contents of which are also incorporated herein by reference, can be useful. In the following discussion, note that present FIG. 23 is closely relates to FIG. 46 of parent application Ser. No. 14/231,025.

As shown in FIG. 23, in some embodiments the system can also enable the customer to optionally create customized gift cards, intended to be delivered to the recipient along with the customer selected product(s) (e.g. a bouquet of flowers with a custom gift card attached). Here the customer can, for example, design a gift card according to their own customized graphics, uploaded images, text, and hand (e.g. driven by the customer's mouse, or finger movement on a touch sensitive screen) written drawings, script, and lettering. This may be implemented by the computer methods and tools discussed herein.

In this ecommerce embodiment, when the customer then purchases the product and the associated gift card, the system can be configured to direct the delivery merchant to print out this handmade customer generated card and deliver it to the recipient along with the product/gift.

Easy customer gift card customization: Here, the document customization methods disclosed herein can be quite valuable for certain ecommerce functions, such as gifts. This is because often a gift recipient values the thought (i.e. affection, good intentions) behind a gift as much or more than the gift itself.

In this regards, however, present industry practice of only providing standardized gift card designs, even if customized lettering may be allowed, somewhat defeats this purpose. The methods disclosed herein, however can also be used to provide an easy to use user interface that allows the purchaser of a gift to custom design the art behind the gift cards delivered with the gifts. This in turn provides tangible evidence of the purchaser's thought behind the gift to the recipient. This in turn can further enhance the mutual satisfaction of both the gift giver and recipient. See FIG. 23 for further discussion.

FIG. 23 shows more details of this custom gift card process. Here a database, such as the centralized database previously taught in parent application Ser. No. 14/231,025, or other database (2306), can contain data for various gift card template images, graphic images, and text fonts. Indeed, to minimize royalties as well as to encourage merchant artistic expression, the system may also provide an interface, such as a web browser based administrator webpage, to allow the merchant or other administrator to upload additional gift card template images or graphic images as well. The ecommerce customer may also upload images.

In some embodiments, the gift card interface will appear only after the ecommerce customer has made a product selection, but before the final purchase is done. If the customer elects the gift card option (which will often cost extra), the system outputs a gift card generation interface to the ecommerce computerized device (often to a web browser).

Returning to FIG. 23, the gift card generation interface appearing on the ecommerce customer's computerized device is shown as (2308a). As can be seen, this gift card generation interface is configured to allow the customer to select various gift card template images or graphic images over the internet (2310) using a computerized device running a web browser or app (2308a), enter text to be rendered using various text fonts, as well as sketch drawings or handwriting on the card using a mouse touch sensitive interface, or the like. The output from this creation process can be an electronic gift card file which can be transmitted back to either server (2302-M1a) and/or centralized server (2300, often assisted by software (2204)). Thus once the customer purchases the product (2230b), this electronic gift card file can be transmitted to a printer (2334) associated with the product's shipping location (in this example, this can even be a printer (2334) associated with another merchant-2, operating a different but cooperating server (2302-M2a)).

This printer (2334) can them print out the actual hard copy gift card (2336). The system can also instruct the delivery merchant, here Merchant 2, for example, to then bundle this card (2336) with the purchased product (2330b) and deliver both to the recipient (2332b) at the same time and location. Thus for example, the recipient can get a nice bouquet of flowers (2330b) with an attached customized greeting card. Unlike the flowers which will quickly fade, the card can last forever, and will be more highly valued because it is customized.

In this embodiment, the gift card generation interface can be configured to load one or more previously stored gift card template images on a remote server (e.g. 2300, 2302-M1a) thus creating an image layer, and to then transmit an HTML copy of this image layer to the customer's web browser or app. There the customer can view this image layer, and use their web browser or app to both annotate the images, as well as to transmit an HTML copy of these annotations to the remote server.

The remote server can then use these annotations to create at least one annotation layer, and combine this with the image layer, thus creating an annotated gift card document image. This annotated gift card document image can then be transmitted back to the customer, where they can accept (or modify) this annotated gift card document image. Once accepted, this image can then be transmitted to the printer (2334) in the form of an electronic gift card file or other electronic data format.

Alternatively, in some embodiments, either instead of or in addition to printing out a physical hard copy of the gift card (2336), the system can also send an electronic version of the gift card to the recipient (2332b) or other individuals, for example in the form of email.

Thus in this embodiment, the invention may be a method of using at least one processor to configure at least one ecommerce website to provide a gift card generation interface to create electronic gift card data files associated with a product selected by an ecommerce customer. Here, usually various gift-card templates, images, graphic images, and text fonts will often be pre-loaded on a database, such as a centralized database (2306) or other server database for ecommerce user convenience.

In this embodiment, the server will often be configured to provide web browser or app based administrator control panel (often an administrator web page) that allows a system administrator, such as the merchant responsible for the ecommerce website, to upload additional gift card template images or graphic images to the centralized database (2306) as desired.

Thus when an ecommerce customer interacts with an ecommerce website (e.g. 2301-M1a) and makes at least one product purchase (e.g. for 2230b) using an ecommerce customer web browser or app, often after the purchase(s) are done, the system (e.g. server 2301-Mia or 2300) can be configured to transmit a gift card generation interface (2308a) to the ecommerce user's web browser or app. This can be in the form of a web page or other app configuration instructions.

This gift card generation interface (2308a) can be configured to allow the ecommerce customer to select among various gift card template images or graphic images, or enter text to be rendered using various text fonts, and thus enable the customer to generate an electronic gift card file, which can then be received, stored, and retransmitted according to the processor software.

In a typical configuration, after the ecommerce customer purchases the one or more products (2230b), at least one processor, often located on server (2301-M1a) or (2300) can be used to transmit this electronic gift card file to a printer (2334). In a preferred embodiment, this printer (2334) will be associated with the product shipping location (in this example, merchant 2 is shipping the product). The printer (2334) can then print out a gift card (2336) corresponding to this electronic gift card file. In a preferred embodiment the system will also provide instructions to the shipper (here Merchant 2) to bundle the gift card (2236) with the product (2230b) for subsequent delivery at the requested delivery location (here the address of recipient 2332b).

In a preferred embodiment, the gift card generation interface (2308a) is configured to direct at least one processor (often located in server 2302-Mia or 2300) to load previously stored gift card template images (often stored in database 2306) on either a centralized server (2300) or an ecommerce website web server (e.g. 2302-M1a), as well as to create an image layer, and transmitting an HTML copy of this image layer to the ecommerce customer web browser or app (2308a). There the customer can view the image layer, and use his or her web browser or app to annotate the images as previously discussed. An HTML copy of these annotations can then be transmitted to either a centralized server (2300) or ecommerce website web server (2301-M1a).

There, using the previously described methods, these annotations can be used to create at least one annotation layer. The server or servers can then combine this at least one annotation layer with the image layer producing an annotated gift card document image. As before, the system can then transmit an HTML copy of this annotated gift card document image to the ecommerce customer web browser or app (2308a). The customer or other user can use this web browser or app (2308a) to accept the annotated gift card document image. The system can then use at least one processor (again often located in server 2300 or server 2302-M1a) to transmit this annotated gift card document image (usually in the form of an electronic gift card file or other data format) to a printer associated (2334) preferably associated with the shipping location of the customer's product.

The invention claimed is:

1. A method of annotating or creating web server stored document images using a web browser, said method comprising;
    loading at least one document image on a web server, creating a document image layer, and transmitting an HTML copy of said document image layer to a computerized device running said web browser or app;
    viewing said document image layer within said web browser or app;
    using said web browser or app to annotate said document image layer, thereby producing annotations and transmitting an HTML copy of said annotations to said web server;
    using said annotations at said web server to create at least one annotation layer, and combining said at least one annotation layer with said document image layer producing an annotated document image;
    transmitting an HTML copy of said annotated document image to said web browser or app;
    using said web browser or app to accept said annotated document image and designate a recipient for said annotated document image;
    and transmitting said annotated document image to said recipient.

2. The method of claim 1, in which said at least one annotation layer comprises a text annotation layer and an image annotation layer, and in which each annotation layer and said image layer may be independently saved in a database on said web server.

3. The method of claim 2, wherein transmitting said annotated document image is done by merging said image layer, said text annotation layer, and said image annotation layer, thereby creating merged layers;
    creating a PDF file of said merged layers, and transmitting said merged layers as said annotated document image.

4. The method of claim 1, in which the HTML has HTML 5 canvas functionality, and further using said HTML5 canvas functionality to manipulate said image layers.

5. The method of claim 1, further uploading a signature image or signature series of motions from said web browser to said web server for future use for annotating document images with a signature.

6. The method of claim 1, wherein said annotations comprise standard electronic drawing commands including lines, rectangles, circles, ovals, arcs, curves, points, and brushstrokes of various widths, colors, and textures.

7. The method of claim 1, further loading said document images on said web server by direct analog fax reception, email using standard POP or IMAP protocols, email attachment, uploading from a different web server, uploading from said web browser or app, use of a file already stored on said web server, and uploading from a third party email service by use of third party service API.

8. The method of claim 1, further transmitting said annotated document images to said recipient by printing from said web browser running on said computerized device, downloading from said web browser running on said computerized device, transmitting an analog fax signal to a third party fax, transmitting an email to a third party email account, transmitting an email attachment to a third party email account, uploading to a third party server, mailing a copy to a third party, or storing a copy of said annotated document image on said web server.

9. The method of claim 1, further storing a sequence of web browser or app image annotations in said web server, and allowing a user to sequentially undo said sequence of web browser or app image annotations and see a resulting partially undone annotated document image in said web browser or app.

10. The method of claim 1, further using said web browser or app to adjust at least brightness or contrast of said document images on said web server, and viewing results of said brightness or contrast adjustments on said web browser.

11. The method of claim 1, further using said web browser or app to adjust a position or angle of said annotations on said web server, and viewing results of said web browser or app adjustments on said web browser or app.

12. The method of claim 1, wherein said web server stored document images were obtained from fax transmissions sent by at least one sender with a sender identity;
    said fax transmissions have an associated sender telephone number or CSID text string;
    further using said sender telephone number or CSID text string, in association with a file associating said telephone number or CSID text string with said sender identity to automatically store said fax transmissions in files or a database in a manner that links said fax transmissions with said sender identity.

13. The method of claim 12, further providing a user interface to divide said fax transmission into one or more separate fax documents.

14. The method of claim 1, wherein said web server is at least one ecommerce web server configured to provide an ecommerce website using information provided by at least one database, said at least one ecommerce web server further configured to be remotely controlled by an administrator using a web browser or app based administrator control panel, further using said method to configure said at least one ecommerce website to provide a gift card generation interface to create electronic gift card data files associated with a product selected by an ecommerce customer using said ecommerce website;
    wherein said at least one database further comprises a plurality of gift card template images, graphic images, and text fonts;
    further providing, on said web browser or app based administrator control panel, an interface to allow said administrator to upload additional gift card template images or graphic images to said at least one database;
    wherein an ecommerce customer interacts with said ecommerce website and makes at least one product purchase using an ecommerce customer web browser or app, said at least one product purchase having a product shipping location, and a product delivery location;

further using said at least one processor to provide, after said at least one product purchase request, a gift card generation interface on said ecommerce customer web browser or app;

said gift card generation interface configured to allow said ecommerce customer to select said gift card template images or graphic images, or enter text to be rendered using said text fonts, thereby enabling said ecommerce customer to generate an electronic gift card file;

using said at least one processor to receive said electronic gift card file;

where upon purchase of said product selected by said ecommerce customer, using said at least one processor to transmit said electronic gift card file to a printer associated with said product shipping location, and printing out a gift card corresponding to said electronic gift card file; and further using said at least one processor to provide instructions to bundle said gift card with said product for subsequent delivery at said product delivery location.

15. The method of claim 14, wherein said gift card generation interface is configured to direct said at least one processor to load previously stored gift card template images on said at least one ecommerce web server, creating an image layer, and transmitting an HTML copy of said image layer to said ecommerce customer web browser or app;

viewing said image layer within said ecommerce customer web browser or app;

using said ecommerce customer web browser or app to annotate said images, transmitting an HTML copy of said annotations to either said at least one ecommerce web server;

using said annotations at said at least one ecommerce web server to create at least one annotation layer, and combining said at least one annotation layer with said image layer producing an annotated gift card document image;

transmitting an HTML copy of said annotated gift card document image to said ecommerce customer web browser or app; and using said ecommerce customer web browser or app to accept said annotated gift card document image;

and using said at least one processor to transmit said annotated gift card document image as an electronic gift card file to a printer associated with said product shipping location.

16. A method of annotating or creating web server stored document images using a web browser, said method comprising;

loading at least one document image on a web server, creating a document image layer, and transmitting an HTML copy of said document image layer to a computerized device running said web browser or app;

viewing said document image layer within said web browser or app;

using said web browser or app to annotate said document image layer, thereby producing annotations, and transmitting an HTML copy of said annotations to said web server;

using said annotations at said web server to create at least one annotation layer, and combining said at least one annotation layer with said document image layer producing an annotated document image;

said method using HTML with HTML 5 canvas functionality, and further using said HTML5 canvas functionality to manipulate said image layers;

transmitting an HTML copy of said annotated document image to said web browser or app;

using said web browser or app to accept said annotated document image and designate a recipient for said annotated document image;

and transmitting said annotated document image to said recipient wherein said web server is at least one ecommerce web server configured to provide an ecommerce website using information provided by at least one database, said at least one ecommerce web server further configured to be remotely controlled by an administrator using a web browser or app based administrator control panel, further using said method to configure said at least one ecommerce website to provide a gift card generation interface to create electronic gift card data files associated with a product selected by an ecommerce customer using said ecommerce website;

wherein said at least one database further comprises a plurality of gift card template images, graphic images, and text fonts;

further providing, on said web browser or app based administrator control panel, an interface to allow said administrator to upload additional gift card template images or graphic images to said at least one database;

wherein an ecommerce customer interacts with said ecommerce website and makes at least one product purchase using an ecommerce customer web browser or app, said at least one product purchase having a product shipping location, and a product delivery location;

further using said at least one processor to provide, after said at least one product purchase request, a gift card generation interface on said ecommerce customer web browser or app;

said gift card generation interface configured to allow said ecommerce customer to select said gift card template images or graphic images, or enter text to be rendered using said text fonts, thereby enabling said ecommerce customer to generate an electronic gift card file;

using said at least one processor to receive said electronic gift card file;

where upon purchase of said product selected by said ecommerce customer, using said at least one processor to transmit said electronic gift card file to a printer associated with said product shipping location, and printing out a gift card corresponding to said electronic gift card file; and further using said at least one processor to provide instructions to bundle said gift card with said product for subsequent delivery at said product delivery location.

17. The method of claim 16, in which said at least one annotation layer comprises a text annotation layer and an image annotation layer, and in which each annotation layer and said image layer may be independently saved in a database on said web server.

18. The method of claim 17, further storing a sequence of web browser or app image annotations in said web server, and allowing a user to sequentially undo said sequence of web browser or app image annotations and see a resulting partially undone annotated document image in said web browser or app.

19. The method of claim 18, wherein said gift card generation interface is configured to direct said at least one processor to load previously stored gift card template images on said at least one ecommerce web server, creating an image layer, and transmitting an HTML copy of said image layer to said ecommerce customer web browser or app;

viewing said image layer within said ecommerce customer web browser or app;

using said ecommerce customer web browser or app to annotate said images, transmitting an HTML copy of said annotations to either said at least one ecommerce web server;

using said annotations at said at least one ecommerce web server to create at least one annotation layer, and combining said at least one annotation layer with said image layer producing an annotated gift card document image;

transmitting an HTML copy of said annotated gift card document image to said ecommerce customer web browser or app; and using said ecommerce customer web browser or app to accept said annotated gift card document image;

and using said at least one processor to transmit said annotated gift card document image as an electronic gift card file to a printer associated with said product shipping location.

* * * * *